United States Patent
Pesaturo et al.

(10) Patent No.: US 9,039,996 B2
(45) Date of Patent: May 26, 2015

(54) SILICON SUBSTRATE OPTIMIZATION FOR MICROARRAY TECHNOLOGY

(75) Inventors: Massimiliano Pesaturo, Scottsdale, AZ (US); Robert J. Powell, Carrollton, TX (US)

(73) Assignee: STMicroelectronics, Inc., Coppell, TX (US)

( * ) Notice: Subject to any disclaimer, the term of this patent is extended or adjusted under 35 U.S.C. 154(b) by 752 days.

(21) Appl. No.: 13/272,063

(22) Filed: Oct. 12, 2011

(65) Prior Publication Data

US 2012/0093700 A1    Apr. 19, 2012

Related U.S. Application Data

(60) Provisional application No. 61/392,427, filed on Oct. 12, 2010.

(51) Int. Cl.
*B01L 3/00* (2006.01)
*C40B 60/10* (2006.01)

(52) U.S. Cl.
CPC .......... *C40B 60/10* (2013.01); *B01L 3/502707* (2013.01); *B01L 3/502761* (2013.01); *B01J 2219/00317* (2013.01); *B01J 2219/00466* (2013.01); *B01J 2219/00702* (2013.01); *B01L 2200/0668* (2013.01); *B01L 2300/16* (2013.01)

(58) Field of Classification Search
CPC .......... B23B 15/00; B23B 15/20; B23B 3/00; B23B 19/00; H01L 33/48; H01L 29/66; B01J 19/00; G01N 21/658; G01N 21/62; G01N 21/63
USPC .......................................... 436/165; 422/502
See application file for complete search history.

(56) References Cited

U.S. PATENT DOCUMENTS

| | | | |
|---|---|---|---|
| 6,406,777 B1 * | 6/2002 | Boss et al. ................ | 428/209 |
| 7,013,033 B2 | 3/2006 | Arena et al. | |
| 7,033,754 B2 | 4/2006 | Chee et al. | |
| 2003/0118731 A1 * | 6/2003 | He et al. .................... | 427/307 |

* cited by examiner

*Primary Examiner* — Lore Jarrett
(74) *Attorney, Agent, or Firm* — Seed IP Law Group PLLC

(57) ABSTRACT

A micro device includes a substrate and a structure configured to bind to an object or a material, or not to bind to an object or material. The structure has a roughness based on a roughness of the object or material. For example, a microarray includes a substrate and a well positioned in the substrate and configured to bind to a type of bead. The well has a roughness based on a roughness of the type of bead to which the well is configured to bind. The roughness of the well is controlled by controlling a position and number of striations in the side of the well. In another example, a moveable component of a micro device may have a roughness different from a roughness of an adjacent component, to reduce the likelihood of the moveable component sticking to the adjacent component.

18 Claims, 22 Drawing Sheets

SILICON SUBSTRATE OPTIMIZATION FOR MICROARRAY TECHNOLOGY

BACKGROUND

1. Technical Field

The present disclosure relates to micro devices and methods of manufacturing and using micro devices. In particular this disclosure relates to controlling features of a surface of a micro device, such as beadchip microarray devices, which may be configured, for example for use in detecting DNA, RNA and proteins, MEMS or NEMS devices, etc.

2. Description of the Related Art

A beadchip microarray is a device that is typically constructed using an array of functionalized beads (for example, detection probes attached to beads rather than directly to a substrate). Beadchip microarrays may be used, for example, as DNA detection devices. See, for example, U.S. Pat. No. 7,013,033, entitled "System for the Automatic Analysis of Images Such as DNA Microarray Images," and issued to Arena, et al. The beads are typically attached to the substrate via entrapment in an array of wells or depressions. The substrate may be planer or have other shapes. The beads may be spherical, for example, the beads may be microspheres, or may have other shapes. The substrate may be made of a variety of materials, and often may be made of a material that facilitates optical detection, such as glass or plastics that do not interfere with detection of fluoresce of beads. The substrate may, for example, be a terminal end of a bundle of fiber optic cables, with a well formed in a terminal end of each cable in the bundle. In another example, the substrate may comprise a plurality of wells. The size of a well may depend on a type of bead to be attached to the well. The beads may be held in the wells by forces which may comprise, for example, covalent, ionic and electrostatic forces and preparations creating a hydrophobic or hydrophilic surface condition, and various combinations thereof. The technology uses substrate/bead pairings that allows the association or the link of the beads at the wells on the surface substrate to be detected. See Arena. It is desirable to avoid movement of the beads from the wells during the course of an assay. See, for example, U.S. Pat. No. 7,033,754, entitled "Decoding of Array Sensors with Microspheres," and issued to Chee, et al.

Micro-ElectroMechanical Systems (MEMS) refers to microscopic mechanical devices, such as sensors, actuators, and electronics, typically fabricated on or in silicon chips or a silicon substrate using micro-fabrication technology. For example, a MEMS device may comprise a first suspended electrode and a second electrode separated by a submicron opening. MEMS devices may generally comprise moveable components such as mechanical components and may, for example, range in size from a micrometer (a millionth of a meter) to a millimeter (a thousandth of a meter), and can include three-dimensional lithographic features employing various geometries.

Typical applications for MEMS devices and systems include piezoelectrics for printers or bubble ejection of ink, accelerometers to control the deployment of airbags, gyroscopes for dynamic stability control, pressure sensors used in transportation and medical applications, such as car tire pressure sensors and disposable blood pressure sensors, micromirrors used to form displays, optical switching technology for data communications, and heated chambers for fluidic applications.

A related technology to MEMS devices are Nano-Electro-Mechanical Systems (NEMS), which are similar to MEMS but on a smaller scale, including displacements and forces at the molecular and atomic scales. MEMS, NEMS and nano-technology facilitate providing mechanical and electrical devices on, for example, a single chip, that may be much smaller, more functional and reliable, and produced at a fraction of the cost of conventional macroscale elements.

BRIEF SUMMARY

As noted above, it is desirable to avoid movement of the beads from the wells during the course of an assay. Considering that the interaction forces between the beads and the wells are proximity forces, the wells are typically shaped as circular upside-down semi-cones in order to increase the interaction between beads and wells. Based on the consideration that the beads are intrinsically rough, an embodiment increases the surface contact, so as to increase the Van der Waals interaction force between beads and wells, by generating wells with rough surfaces. In an embodiment, the relative roughness of the beads and the wells may be controlled to make the beads more likely, or less likely, to stick to the wells.

Conversely, moveable components of micro devices such as MEMS or NEMS devices, for example, silicon-based components, may sometimes stick to themselves or to other components, including other moveable components. This can happen, for example, during a manufacturing process, during transportation, during use, etc. The roughness of surfaces of components of micro devices, such as MEMS or NEMS devices, may be controlled to make a moveable component more, or less, likely to stick to another component of a device.

In an embodiment, a method comprises analyzing roughness characteristics of a first surface, determining roughness characteristics of a second surface based on the analysis of the roughness characteristics of the first surface, the second surface being a surface of a substrate, generating surface preparation parameters based on the determined roughness characteristics, and forming the second surface based on the generated surface preparation parameters, the determining, the generating and the forming being performed using one or more configured computing devices. In an embodiment, the generating surface preparation parameters comprises determining a shape of an opening in a mask and the forming the second surface comprises apply the mask to the substrate and etching the substrate. In an embodiment, the opening has a substantially polygonal shape. In an embodiment, the first surface is a surface of a type of object. In an embodiment, the determining roughness characteristics of the second surface comprises determining roughness characteristics to bind to the type of object based on an analysis of roughness characteristics of the type of object. In an embodiment, the type of object is a type of linking layer. In an embodiment, the first surface is a surface of a first type of bead, the second surface is an inside surface of a well positioned in the substrate and configured to bind to the surface of the first type of bead, and the determining roughness characteristics of the second surface based on the analysis of the roughness characteristics of the first surface comprises determining roughness characteristics similar to the roughness characteristics of the first surface. In an embodiment, the forming the second surface comprises forming a plurality of striations in the inside surface of the well and a number and positioning of the plurality of striations are based on the determined roughness of the surface of the first type of bead to which the well is configured to bind. In an embodiment, the plurality of striations have a thickness based on the roughness of the surface of the first type of bead to which the well is configured to bind. In an embodiment, the well has an upper perimeter having a plurality of corners. In an embodiment, each striation extends longitudinally from at least proximate a respective corner of the plurality of corners toward a lower perimeter of the well. In an embodiment, the well is one of a first plurality of wells positioned in the substrate and configured to bind to the first type of bead, and each well in the first plurality of wells has a roughness based on the roughness of the surface of the first type of bead. In an embodiment, the method further comprises forming a second plurality of wells positioned in the substrate and configured to bind to a second type of bead, wherein each well in the second plurality of wells has a roughness based on a roughness of the second type of bead. In an embodiment, the substrate comprises a terminal end of a bundle of fiber optic cables. In an embodiment, the first surface is another surface of the substrate and the determining the roughness characteristics of the second surface comprises determining roughness characteristics dissimilar to the roughness characteristics of the first surface. In an embodiment, the first surface is another surface of the substrate and the determining the roughness characteristics of the second surface comprises determining roughness characteristics similar to the roughness characteristics of the first surface.

In an embodiment, a method comprises identifying roughness characteristics of a type of microbead; determining roughness characteristics of a well to bind to the type of microbead based on the identified roughness characteristics of the type of microbead; generating well parameters based on the determined roughness characteristics; and forming a well in a substrate based on the generated well parameters. In an embodiment, at least the generating well parameters and the forming the well in the substrate are performed under control of at least one processor. In an embodiment, the generating well parameters comprises determining a shape of an opening in a mask and the forming the well in the substrate comprises applying the mask to the substrate and etching the well in the opening in the substrate. In an embodiment, the opening has a substantially polygonal shape.

In an embodiment, a non-transitory computer readable medium's contents cause at least one processor to perform a method, the method comprising identifying roughness characteristics of a type of microbead, determining roughness characteristics of a well to bind to the type of microbead based on the identified roughness characteristics of the type of microbead, and generating well design parameters based on the determined roughness characteristics. In an embodiment, the method further comprises forming a well in a substrate based on the well design parameters. In an embodiment, the generating well design parameters comprises determining a shape of an opening in a mask and the forming the well in the substrate comprises applying the mask to the substrate and etching the well in the opening in the substrate.

In an embodiment, a micro device comprises a substrate, and a structure of the substrate, at least a portion of a surface of the structure having a plurality of substantially parallel striations wherein a number and a position of the substantially parallel striations is based on a roughness of another surface. In an embodiment, the structure is a well in the substrate configured to bind to a type of microbead, the at least a portion of the surface of the structure is an inner surface of the well and the another surface is a surface of the type of microbead to which the well is configured to bind. In an embodiment, the structure is a pillar extending from the substrate configured to bind to a type of microbead, the at least a portion of the surface of the structure is an outer surface of the pillar and the another surface is a surface of the type of microbead to which the pillar is configured to bind. In an embodiment, the structure is a moveable component of the micro device coupled to the substrate, and the another surface is surface of another component of the micro device.

In an embodiment, a system comprises a micro device including a substrate having a plurality of structures configured to bind to a type of object, wherein the structures have a roughness based on a roughness of the type of object to which the structures are configured to bind, and logic coupled to the micro device and configured to analyze data related to binding of objects to the plurality of structures. In an embodiment, the micro device comprises a second plurality of structures configured to bind to a second type of object, wherein each structure in the second plurality of structures has a roughness based on a roughness of the second type of object. In an embodiment, the object is a type of linking layer. In an embodiment, the object is a first type of moiety of a moiety pair.

In an embodiment, a microarray comprises a substrate, and a well positioned in the substrate and configured to bind to a first type of bead, wherein the well has a roughness based on a roughness of the first type of bead to which the well is configured to bind. In an embodiment, the well comprises a plurality of striations and a number and positioning of the plurality of striations are based on the roughness of the first type of bead to which the well is configured to bind. In an embodiment, the plurality of striations have a thickness based on the roughness of the first type of bead to which the well is configured to bind. In an embodiment, the substrate comprises a terminal end of a bundle of fiber optic cables. In an embodiment, the roughness of the well is similar to the roughness of the first type of bead. In an embodiment, the well has an upper perimeter having a plurality of corners. In an embodiment, a number and positioning of the plurality of corners is based on the roughness of the first type of bead to which the well is configured to bind. In an embodiment, the well has a plurality of striations, each striation extending longitudinally from at least proximate a respective corner of the plurality of corners toward a lower perimeter of the well. In an embodiment, the upper perimeter has a substantially polygonal shape. In an embodiment, the upper perimeter has a substantially rectilinear shape. In an embodiment, the upper perimeter has a substantially rectilinear portion and a substantially curved portion. In an embodiment, the well is one of a first plurality of wells positioned in the substrate and configured to bind to the first type of bead, and each well in the first plurality of wells has a roughness based on the roughness of the first type of bead. In an embodiment, the microarray further comprises a second plurality of wells positioned in the substrate and configured to bind to a second type of bead, wherein each well in the second plurality of wells has a roughness based on a roughness of the second type of bead. In an embodiment, the first plurality of wells comprises at least one well having a first number of striations and the second plurality of wells comprises at least one well having a second number of striations different from the first number of striations. In an embodiment, the at least one well having a first number of striations has a first upper diameter and the at least one well having a second number of striations has a second upper diameter different from the first upper diameter. In an embodiment, the well has a plurality of striations, a number of the plurality of striations being based on the roughness of the first type of bead, and each striation extends longitudinally from at least proximate an upper perimeter of the well toward a lower perimeter of the well.

In an embodiment, a micro device comprises a first structure having a first surface, the first surface having a first roughness, and a second structure having a second surface, the second surface having a second roughness, wherein the second surface has a plurality of substantially parallel striations, a positioning and a number of the plurality of striations being based on the first roughness. In an embodiment, the first and second roughnesses are dissimilar. In an embodiment, the first surface has a plurality of substantially parallel striations, a positioning, a number of the plurality of striations of the first surface being different that the positioning and number of the plurality of striations of the second surface. In an embodiment, the first surface is a surface of a moveable component of the micro device.

In an embodiment, a well perimeter is designed as polygonal, rather than as circular as in conventional wells, with each corner of the polygon a potential origin of an individual striation in the wall of the well. In an embodiment, the roughness of the wells formed in the substrate is controlled by controlling a level and number of striations in the walls of the wells. In an embodiment, the roughness of the sides of the wells is controlled such that there is a differential affinity of the beads to attach to the different wells in the surface of the substrate. In an embodiment, one or more of the wells of the substrate may comprise a photopolymerizable reagent. In an embodiment, pillars may be used in addition to or instead of wells or depressions.

In an embodiment, a system comprises: a microarray including: a substrate; and a plurality of wells positioned in the substrate and configured to bind to a type of bead, wherein the wells of the plurality of wells have a roughness based on a roughness of the type of bead to which the wells are configured to bind; and logic coupled to the microarray and configured to analyze data related to binding of beads to the plurality of wells. In an embodiment, each well in the plurality of wells comprises a plurality of striations and a number and positioning of the plurality of striations are based on the roughness of the type of bead to which the well is configured to bind. In an embodiment, the plurality of striations have a thickness based on the roughness of the type of bead to which the well is configured to bind. In an embodiment, each well in the plurality of wells has an upper perimeter having a plurality of corners. In an embodiment, each well in the plurality of wells has a plurality of striations, each striation extending longitudinally from at least proximate a respective corner of the plurality of corners toward a lower perimeter of the well. In an embodiment, the upper perimeter has a substantially polygonal shape. In an embodiment, the microarray comprises a second plurality of wells positioned in the substrate and configured to bind to a second type of bead, wherein each well in the second plurality of wells has a roughness based on a roughness of the second type of bead.

In an embodiment, a system comprises: a plurality of wells configured to bind to respective types of beads having roughness features, each well comprising means for engaging the roughness features of the type of bead to which the well is configured to bind; and means for analyzing data related to binding of beads to the plurality of wells. In an embodiment, the means for engaging comprises a plurality of striations and a number and positioning of the plurality of striations are based on a roughness of the type of bead to which the well is configured to bind. In an embodiment, the system further comprises: means for gathering data related to the binding of beads to the plurality of wells, coupled to the means for analyzing data.

In an embodiment, a non-transitory computer-readable medium's contents cause at least one processor to perform a method, the method comprising: analyzing roughness characteristics of a first surface; determining roughness characteristics of a second surface based on the analysis of the roughness characteristics of the first surface, the second surface being a surface of a substrate; and generating surface preparation parameters based on the determined roughness characteristics. In an embodiment, the analyzing roughness characteristics of the first surface comprises identifying roughness characteristics of a first type of microbead; the determining roughness characteristics of the second surface comprises determining roughness characteristics of a well to bind to the first type of microbead based on the identified roughness characteristics of the type of microbead; and the generating surface preparation parameters based on the determined roughness characteristics comprises generating well design parameters based on the determined roughness characteristics. In an embodiment, the method further comprises forming a well in a substrate based on the well design parameters. In an embodiment, the generating well design parameters comprises determining a shape of an opening in a mask and the forming the well in the substrate comprises applying the mask to the substrate and etching the well in the opening in the substrate. In an embodiment, the first surface is another surface of the substrate and the determining the roughness characteristics of the second surface comprises determining roughness characteristics dissimilar to the roughness characteristics of the first surface.

In an embodiment, a micro device comprises: a substrate; and a first structure of the substrate, at least a portion of a surface of the first structure having a first plurality of substantially parallel striations wherein a number and a position of the substantially parallel striations is based on one or more surface roughness characteristics. In an embodiment, the first structure is a well in the substrate configured to bind to a first type of microbead, the at least a portion of the surface of the first structure is an inner surface of the well and the one or more surface roughness characteristics comprise one or more roughness characteristics of the first type of microbead to which the well is configured to bind. In an embodiment, the first structure is a pillar extending from the substrate configured to bind to a first type of microbead, the at least a portion of the surface of the first structure is an outer surface of the pillar and the one or more roughness characteristics comprise one or more roughness characteristics of the first type of microbead to which the pillar is configured to bind. In an embodiment, the one or more roughness characteristics comprise one or more roughness characteristics of at least a portion of a surface of a second structure of the substrate. In an embodiment, a roughness of the at least a portion of the surface of the first structure and the roughness characteristics of the at least a portion of the surface of the second structure are dissimilar. In an embodiment, the surface of the second structure has a second plurality of substantially parallel striations, a positioning and a number of the second plurality of striations being different that the positioning and number of the first plurality of striations. In an embodiment, the first structure is a moveable component of the micro device.

In an embodiment, a system comprises: a substrate; and a first structure of the substrate, a surface of the first structure having one or more surface roughness characteristics based on one or more roughness characteristics of a first type of object. In an embodiment, the first structure is one of a first plurality of structures configured to bind to the first type of object and the system further comprises logic configured to analyze data related to binding of objects to the first plurality of structures. In an embodiment, the system further comprises a second plurality of structures configured to bind to a second type of object, wherein a surface of each structure in the second plurality of structures has a roughness based on a roughness of the second type of object. In an embodiment, the first type of object is a type of linking layer. In an embodiment, the first type of object is a first type of moiety of a moiety pair. In an embodiment, the first type of object is a surface of a second structure of the substrate and the one or more surface roughness characteristics of the surface of the first structure are dissimilar to the one or more roughness characteristics of the surface of the second structure.

DETAILED DESCRIPTION

Figure 1:
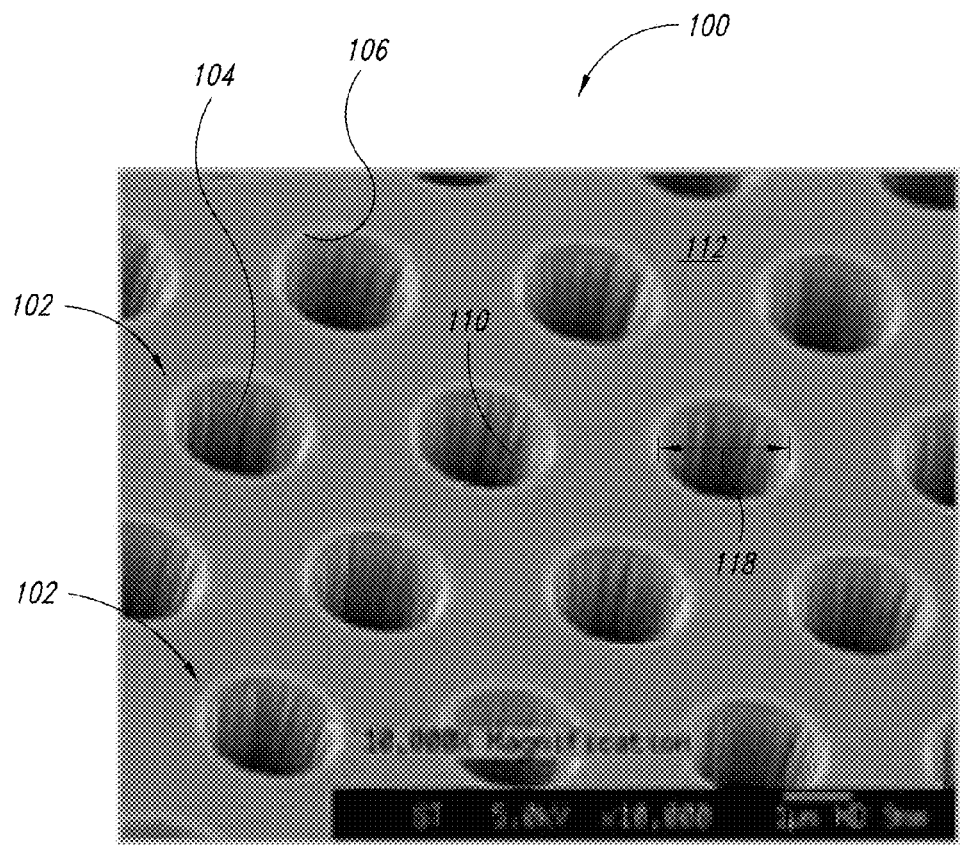
FIG. 1 is a view of an embodiment of a substrate.

In the following description, certain details are set forth in order to provide a thorough understanding of various embodiments of devices, methods and articles. However, one of skill in the art will understand that other embodiments may be practiced without these details. In other instances, well-known structures and methods associated with, for example, substrates, fiber optic bundles, microspheres comprising bioactive agents, microtiter plates, etching, processors and coding and decoding schemes, MEMS devices, NEMS devices, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure or the claims.

The sizes and relative positions of elements in the drawings are not necessarily drawn to scale. For example, the shapes of various elements and angles are not drawn to scale, and some of these elements may be enlarged and positioned to improve drawing legibility. Further, the particular shapes of the elements as drawn are not necessarily intended to convey any information regarding the actual shape of particular elements, and have been selected solely for ease of recognition in the drawings. Geometric references are not intended to refer to ideal embodiments. For example, a semi-cone-shaped well does not mean that a well has a geometrically perfect semi-cone shape.

For convenience, embodiments will be described in terms of microarrays and MEMS devices. The concepts disclosed herein also are applicable to other micro-devices and micro-fabricated structures, such as NEMS devices.

Typical dimensions of elements of micro-devices, such as microbeads and wells, may be on the order of less than one to several micrometers in diameter. Other binding structures, such as pillars and depressions, may have similar dimensions. At this size, Van der Waals interaction forces may be taken advantage of to increase the attractive force between beads and wells, for example, to optimize a well for attracting and hold beads of a particular type. As beads are intrinsically rough, this optimization may be performed by designing a well to have a selected roughness.

Figure 2:
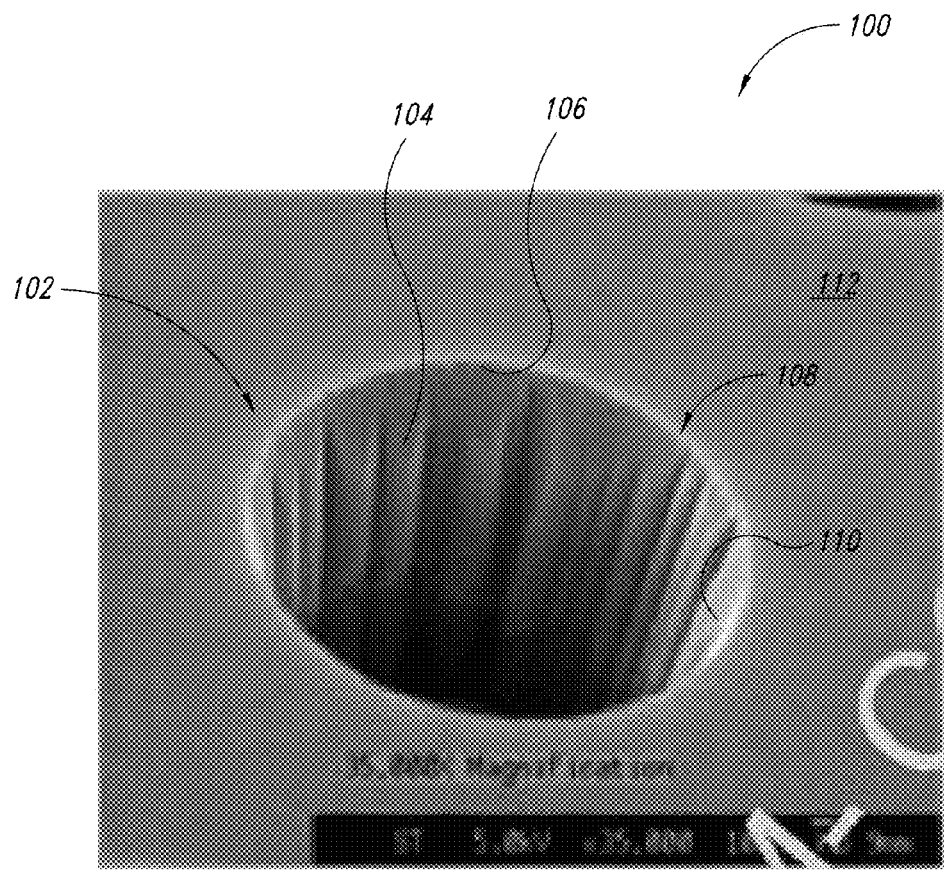
FIG. 2 is a view of an embodiment of a well in the substrate of FIG. 1.
Figure 3:
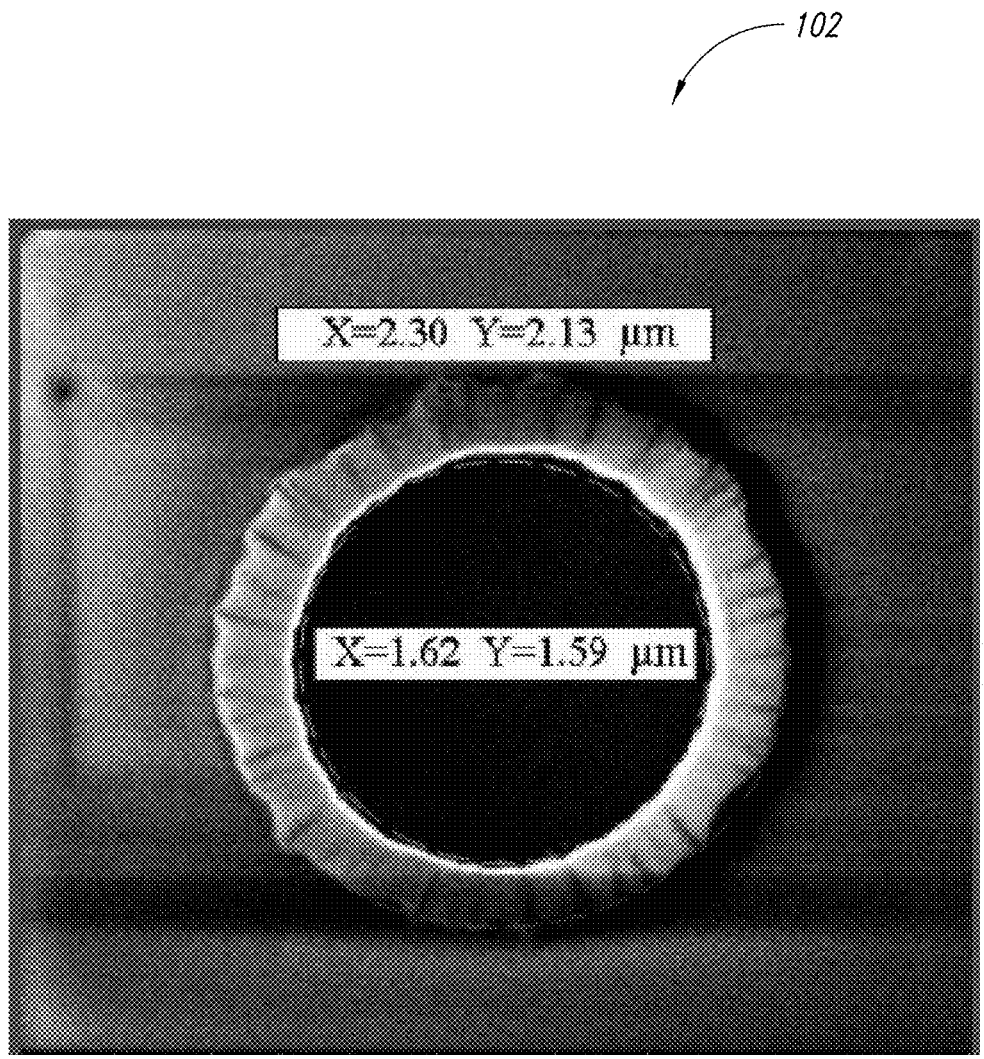
FIG. 3 is a top view of an embodiment of a well in a substrate.
Figure 4:
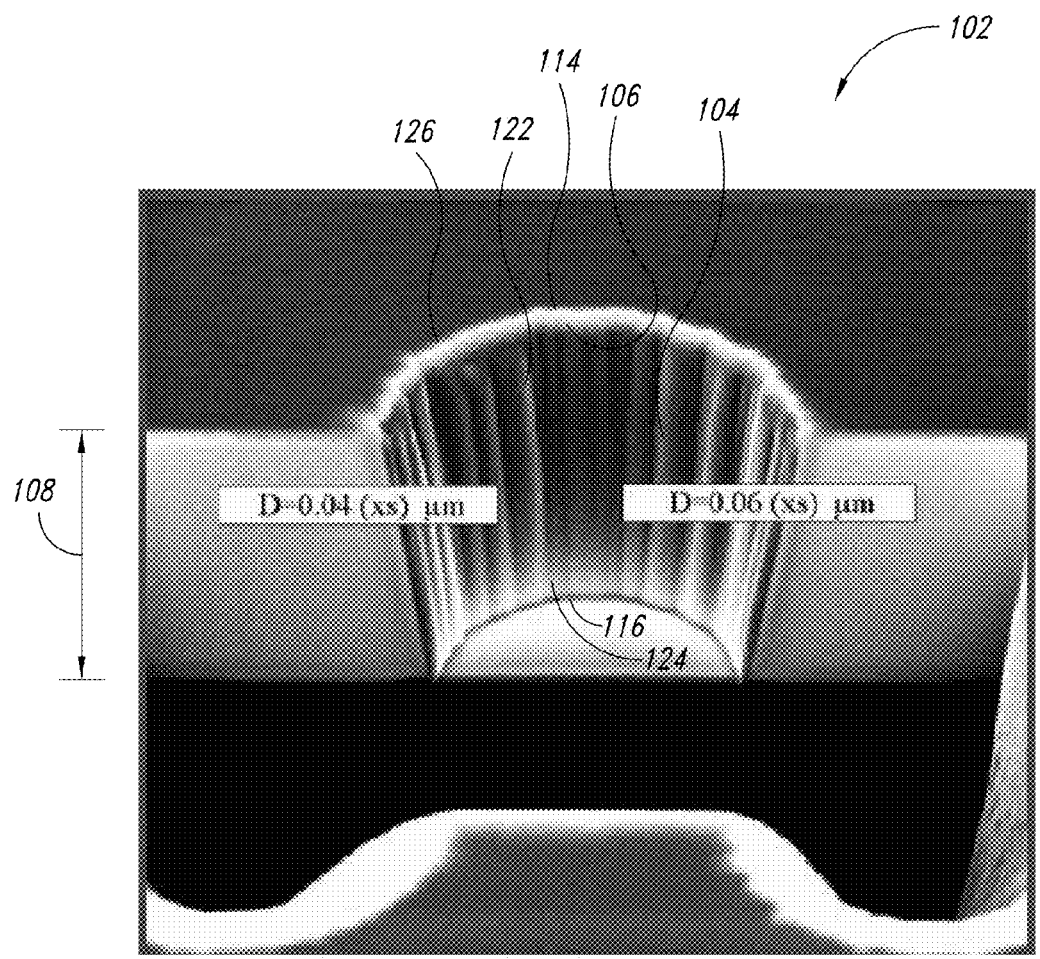
FIG. 4 is a cross-sectional view of an embodiment of a well in a substrate.
Figure 9A:
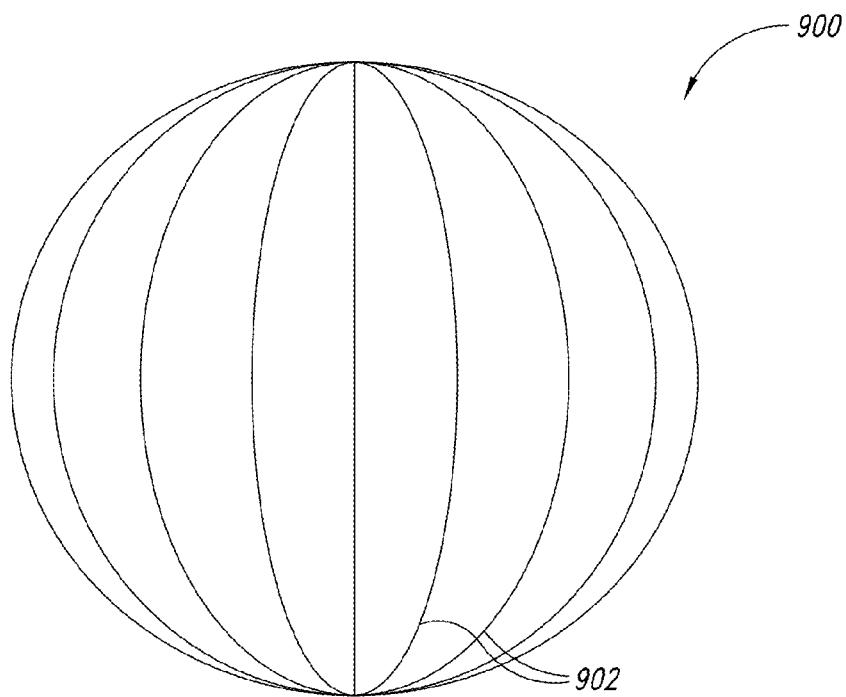
FIGS. 9A and 9B are illustrations of embodiments of a bead.
Figure 9B:
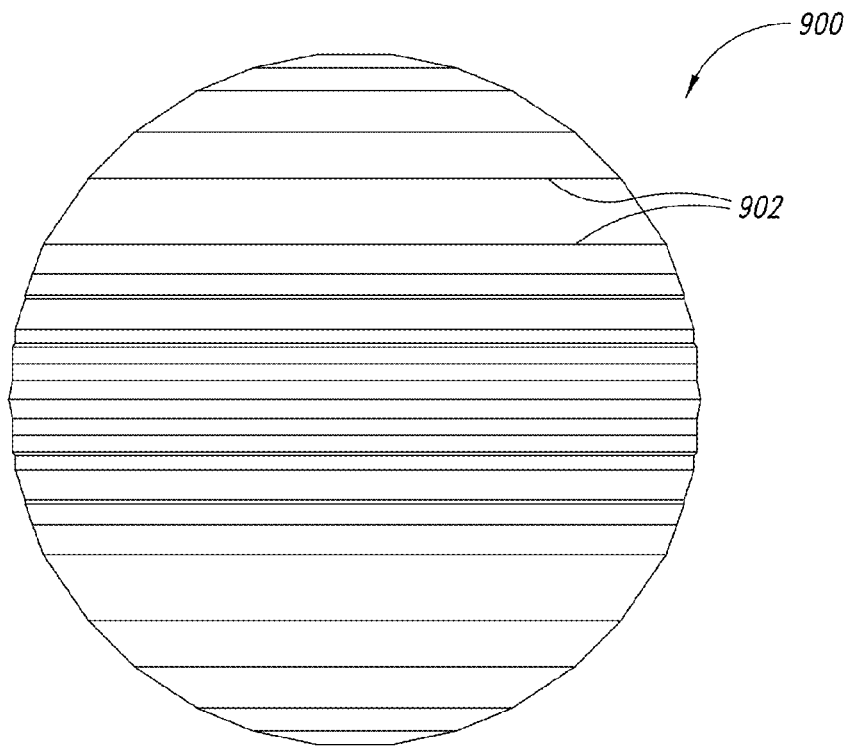

FIG. 1 illustrates a substrate 100 comprising a plurality of wells 102 configured to receive a plurality of beads (see beads 900 in FIGS. 9A and 9B). FIG. 2 is a view of a well 102 in the substrate 100. FIG. 3 is a top view of an embodiment of a well 102. FIG. 4 is a cross-sectional view of an embodiment of a well 102 and a top view of a striation 104.

With reference to FIGS. 1 through 4, the well 102 has an upper perimeter 106 on an upper surface 112 of the substrate 100 and a depth 108 between a top 114 and a bottom 116 of the well 102. The well 102 has a side wall 110 extending between the top 114 and the bottom 116 of the well 102. A plurality of striations 104 extend substantially parallel to each other along the side wall 110 of the well 102. Each striation 104 extends generally longitudinally along the side wall 110 and has an upper end 122 at least proximate the top 114 of the well 102 and a bottom end 124 at least proximate the bottom 116 of the well 102. The bottom 116 of the well 102 may or may not correspond to a bottom surface of the substrate, and may be open or closed. The well 102 has a diameter 118.

Figure 5:
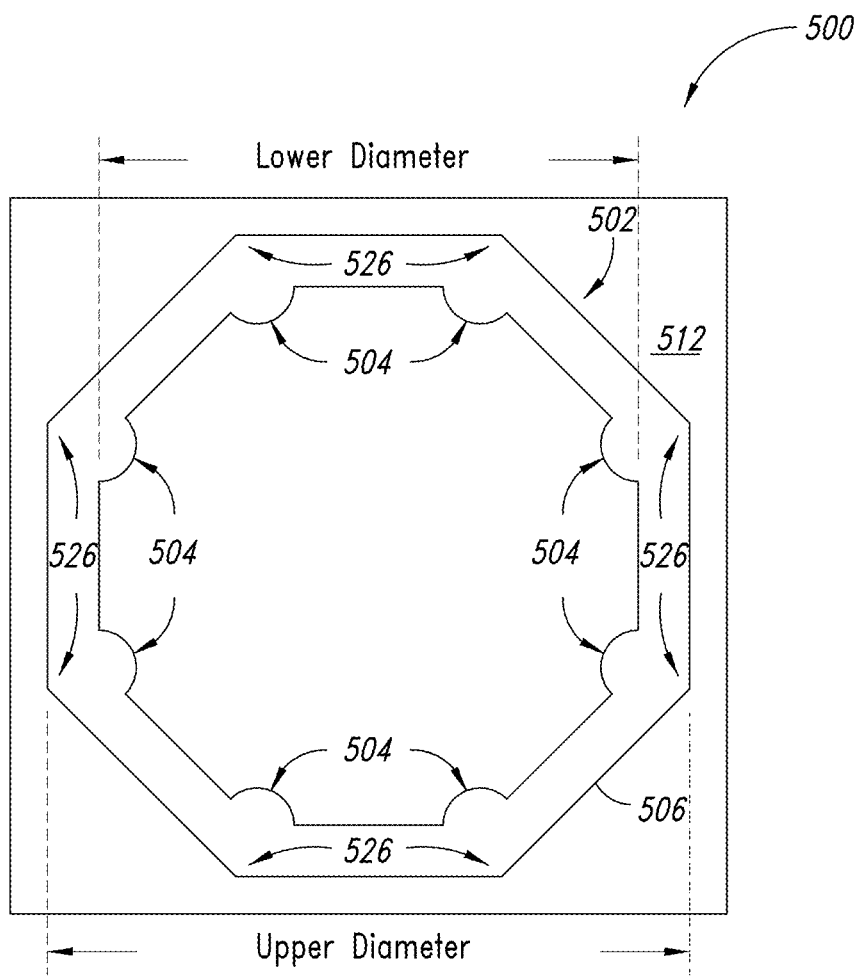
FIG. 5 is a top view illustration of an embodiment of a well in a substrate.

As illustrated, the wells are inverted semi-cones having a generally polygonal-shaped upper perimeter 106, and the striations are at least proximate to corners 126 of the upper perimeter 106. The perimeters of the wells, however, may have various shapes. For example, FIG. 5 illustrates a top cross-section view of an embodiment of a substrate 500 with a well 502 having a substantially rectilinear upper perimeter 506 on a top surface 512 of the substrate 500. The upper perimeter 506 as illustrated is generally polygonal in shape. The well 502 has a plurality of striations 504 that are at least generally proximate the corners 526 of the upper perimeter 506. An eight-sided polygon has been illustrated for ease of illustration. Embodiments may have more or fewer sides, and may typically have more than eight sides. The well 502 has an upper diameter and a lower diameter.

Figure 6:
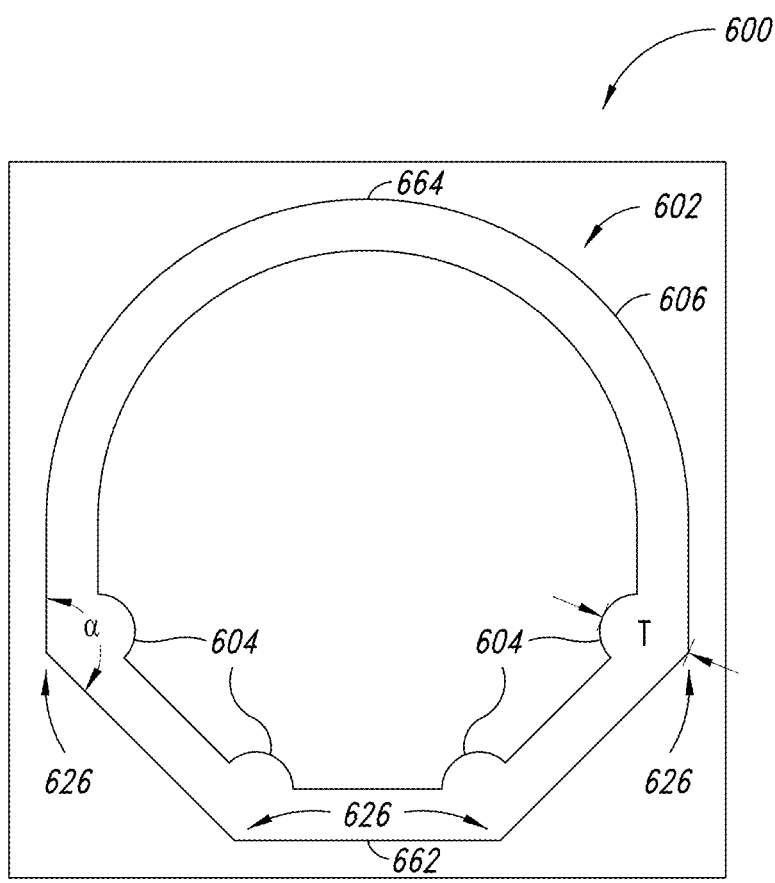
FIG. 6 is a top view illustration of an embodiment of a well in a substrate.

In another example, FIG. 6 illustrates a top-cross section view of an embodiment of a substrate 600 with a well 602 having an upper perimeter 606 with a substantially rectilinear portion 662 and a substantially curved portion 664. Some embodiments may have multiple rectilinear and curved portions in the upper perimeter. The well 602 has a plurality of striations 604 that are at least proximate corners 626 of the rectilinear portion 662 of the upper perimeter 606. Each corner 626 has a respective angle α and each striation has a respective thickness T.

Figure 7:
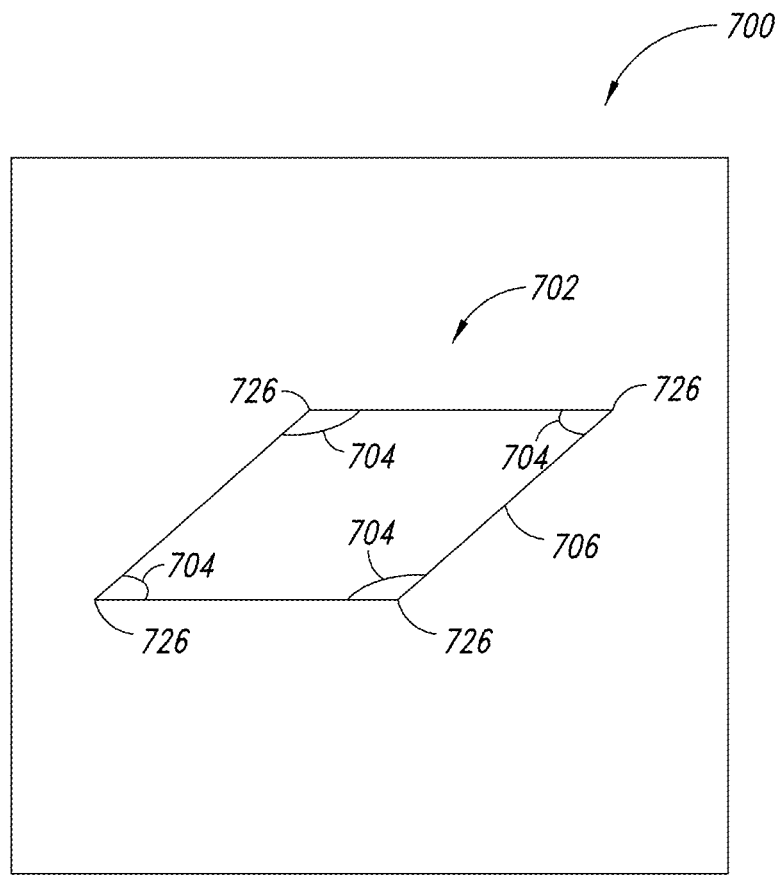
FIG. 7 is a top view illustration of an embodiment of a well in a substrate.

In another example, FIG. 7 illustrates a top-cross section view of an embodiment of a substrate 700 with a well 702 having a rectilinear upper perimeter 706 that as illustrated has a substantially trapezoidal shape with four sides. Some embodiments may have more or fewer sides approximating different overall shapes. The well 702 has a plurality of striations 704 that are at least proximate corners 726 of the upper perimeter 706.

Figure 8:
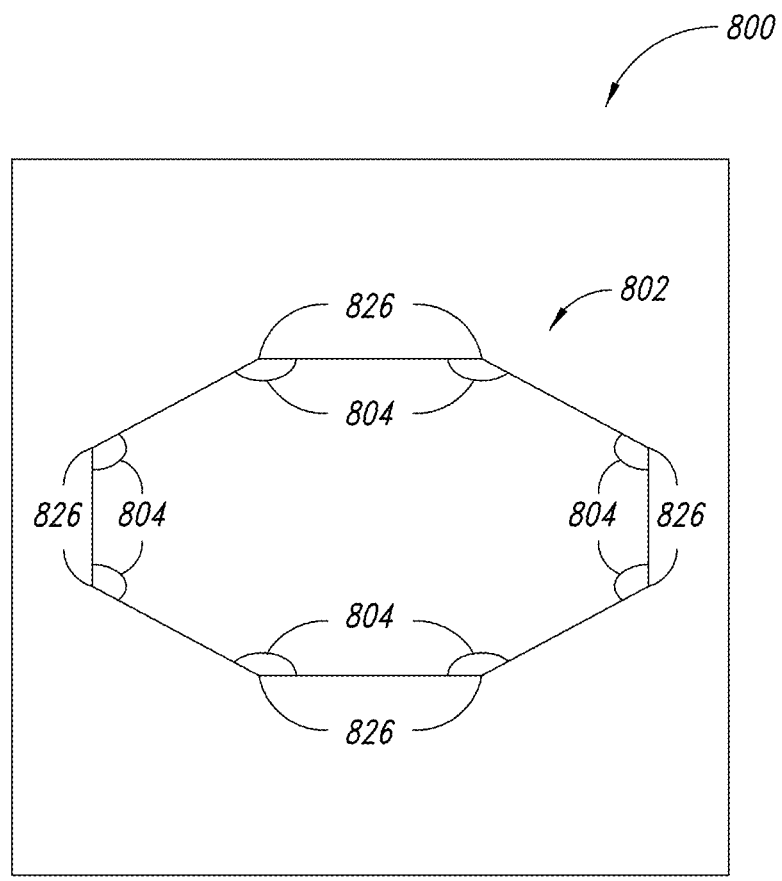
FIG. 8 is a top view illustration of an embodiment of a well in a substrate.

In another example, FIG. 8 illustrates a top-cross section view of an embodiment of a substrate 800 with a well 802 having a rectilinear upper perimeter 806 that as illustrated has a substantially oval shape. Some embodiments may have more or fewer sides approximating different overall shapes. The well 802 has a plurality of striations 804 that are at least proximate corners 826 of the upper perimeter 806.

FIGS. 9A and 9B illustrate example embodiments of beads 900. As illustrated, the beads 900 are generally spherical and have a plurality of striations 902. A bead 900 may have various shapes (for example, elliptical) and various numbers and positions of striations or other features that contribute to a roughness of the bead 902.

Figure 10:
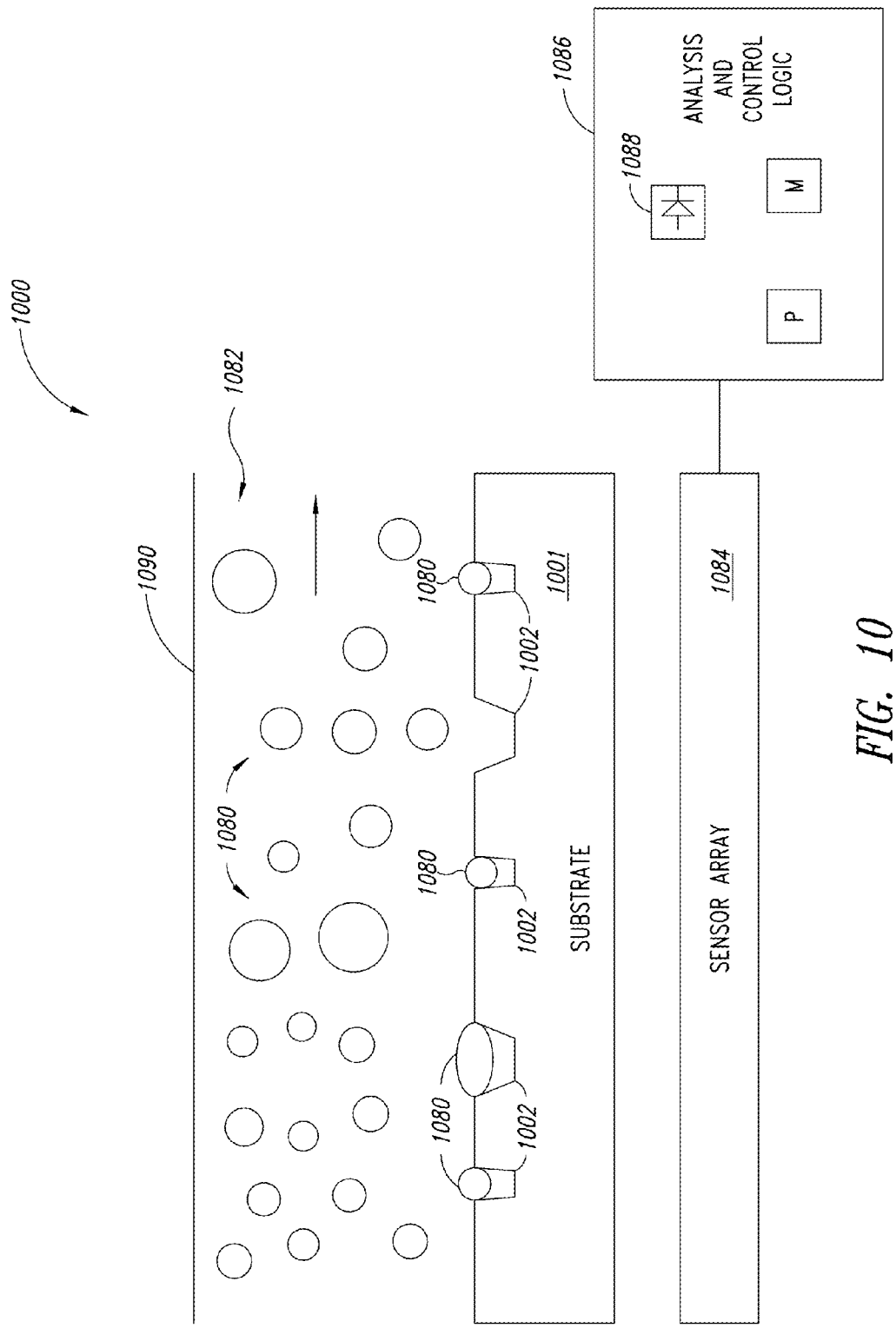
FIG. 10 is a functional block diagram of an embodiment of a microarray system.

FIG. 10 is a functional block diagram of an embodiment of a microarray system 1000. The system 1000 comprises a substrate 1001 having a plurality of wells 1002. The wells 1002 may be of relatively uniform distribution and shape and size, or may be randomly or otherwise distributed and have various shapes and sizes. The wells 1002 may have varying degrees of roughness, and may, for example, comprise one of more of the embodiments of wells illustrated in FIGS. 1-8. The substrate 1001 is exposed to a plurality of beads 1080. For example, the plurality of beads 1080 may pass over the substrate 1001 in a channel 1082 formed between the substrate 1001 and a channel wall 1090. Some of the beads 1080 may be attracted to and trapped in the wells 1002. Some of the wells may not capture any beads. A sensor array 1084 is configured to detect beads captured in the wells 1002 and characteristics of the beads and/or of the wells, and to generate corresponding signals. For example, the sensor array 1084 may detect colors of the beads 1080 and locations of the wells 1002 capturing beads. As illustrated, the sensor array 1084 is separate from and below the substrate 1001. In some embodiments, the sensor array 1084 may be integrated into the substrate 1001 or positioned in another position with respect to the substrate 1001. For example, the sensor array 1084 may be positioned above the substrate and together the sensor array 1084 and the substrate 1001 may form the channel 1082.

The sensor array 1084 is coupled to an analysis and control block 1086, which is configured to analyze signals received from the sensor array 1084. As illustrated, the analysis and control block 1086 comprises a processor P, a memory M and discrete circuitry 1088, configured to process and analyze signals received from the sensor array and to generate control signals to control the system 1000, such as signals to control the flow of beads 1080 through the channel 1082. The analysis and control block 1086 may analyze and generate signals using stored data, such as data stored in the memory M regarding a roughness of a well 1002. The memory M may store instructions that are executed by the processor P and which cause the analysis and control block 1086 to perform one or more of the various functions of the analysis and control block 1086.

Figure 11:
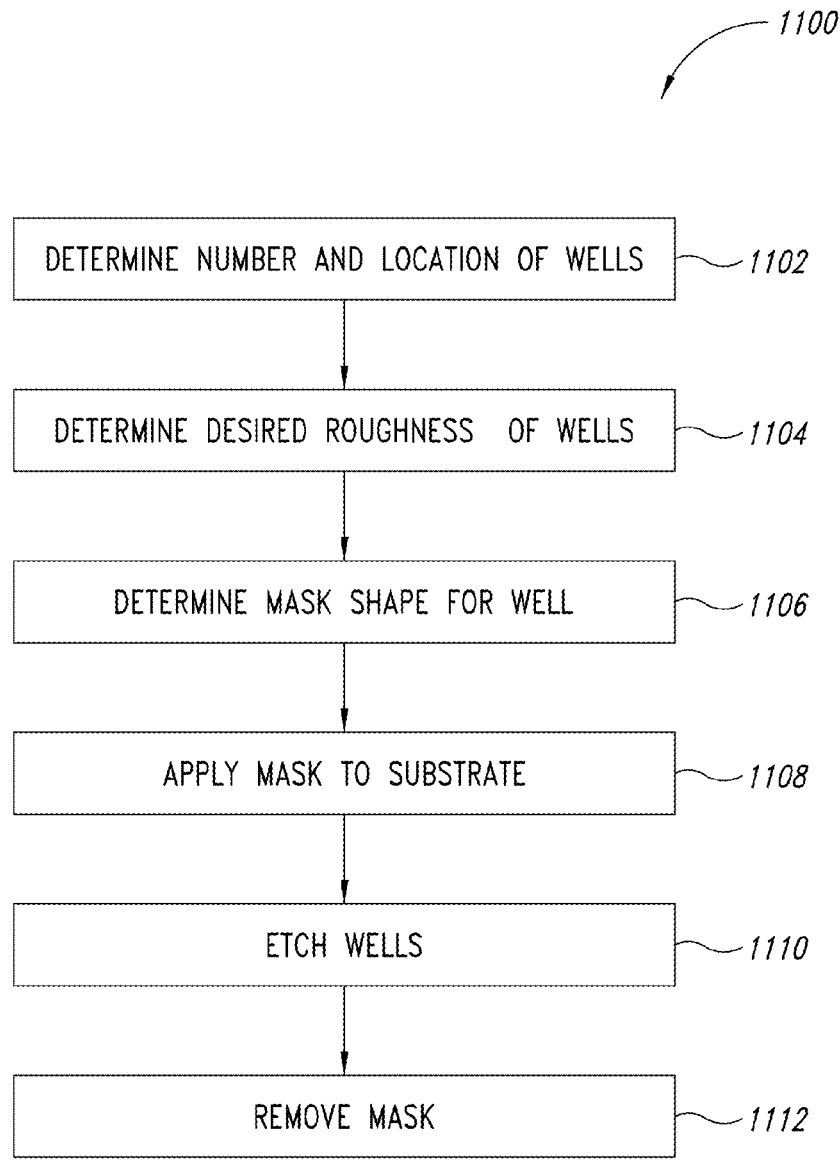
FIG. 11 illustrates an embodiment of a method of forming a bead chip microarray.

FIG. 11 illustrates an embodiment of a method 1100 of forming a bead chip microarray. At act 1102, a desired number and location of wells in a substrate is determined. The desired number and location may be determined based on, for example, characteristics of the beads to be used with the microchip array.

At act 1104, a desired roughness of one or more of the wells is selected. The desired roughness of a well may be determined, for example, based on a roughness of beads to which the well is configured to bind. The desired roughness may be selected so as to increase, or so as to decrease, a likelihood that beads of a selected roughness will bind to the well. For example, a roughness similar to a roughness of a type of bead may be selected when it is desired to increase a likelihood of that type of bead binding to the well. Conversely, a different roughness than a roughness of a type of bead may be selected when it is desired to decrease a likelihood of that type of bead binding to the well. The desired roughness of the well may be uniform or non-uniform. For example, the roughness may be uniform along the sides of the well, or a first portion of the side of a well may have a first roughness, and a second portion of the side of the well may have a different roughness.

At act 1106, a mask shape for the well is determined based on the determined desired roughness. For example, a desired roughness of a well may be correspond to having roughness features spaced a distance apart D and of a selected thickness, such as 0.04 microns. Thus a polygonal mask shape having corners spaced apart a distance D may be selected. Other shapes may be employed. See, for example, FIGS. 6-8. The depth, the diameter and the desired roughness are all factors that may be considered in determining the mask shape. In general, the roughness of the well will be a function of the depth of the well, the upper and lower diameters of the well, and the mask shape. For example, for a given depth and diameters of a well, the angle (see angle α of FIG. 6) of a corner will impact the thickness (see thickness T of FIG. 6) of a striation proximate to the corner.

At act 1108, the selected mask is applied to the substrate. For example, a photo-resistive mask may be applied to the substrate. At act 1110, the wells are etched in the substrate. Etching in general is known. Varying parameters in the etching process may impact the depth and diameters of the well. For example, varying the length of time of the etching process may vary the depth of the well. Thus, varying etching parameters may impact the roughness of the well and thus the etching parameters to be used may be factored into the design of the mask. At act 1112, the mask is removed.

Embodiments of methods of producing a bead chip microarray may include additional acts other than those shown in FIG. 11 and may not contain all the acts shown in FIG. 11. For example, a shape of a punch may be determined instead of a shape of a mask. In another example, some embodiments may include determining a depth of the well. Some embodiments may combine acts or perform acts in different orders. For example, some embodiments may determine the desired roughness of the wells before determining the number and location of the wells, or may combine the acts of determining the desired roughness and determining the number and location of the wells. In another example, mask and etching steps may be applied iteratively.

A variety of techniques may be used to form wells in a substrate, including, for example, photolithography, stamping, molding and etching, and combinations thereof. These techniques can be modified so that the desired roughness of the well is considered in the design and manufacturing process of the well. For example, as described above with respect to FIG. 11, the shape of the mask may be designed so as to generate striations at desired locations. Similarly, the shape of the punch in a stamping technique or the shape of a mold in a molding technique may be modified to control the roughness of a well produced by the punch or the mold.

Figure 12:
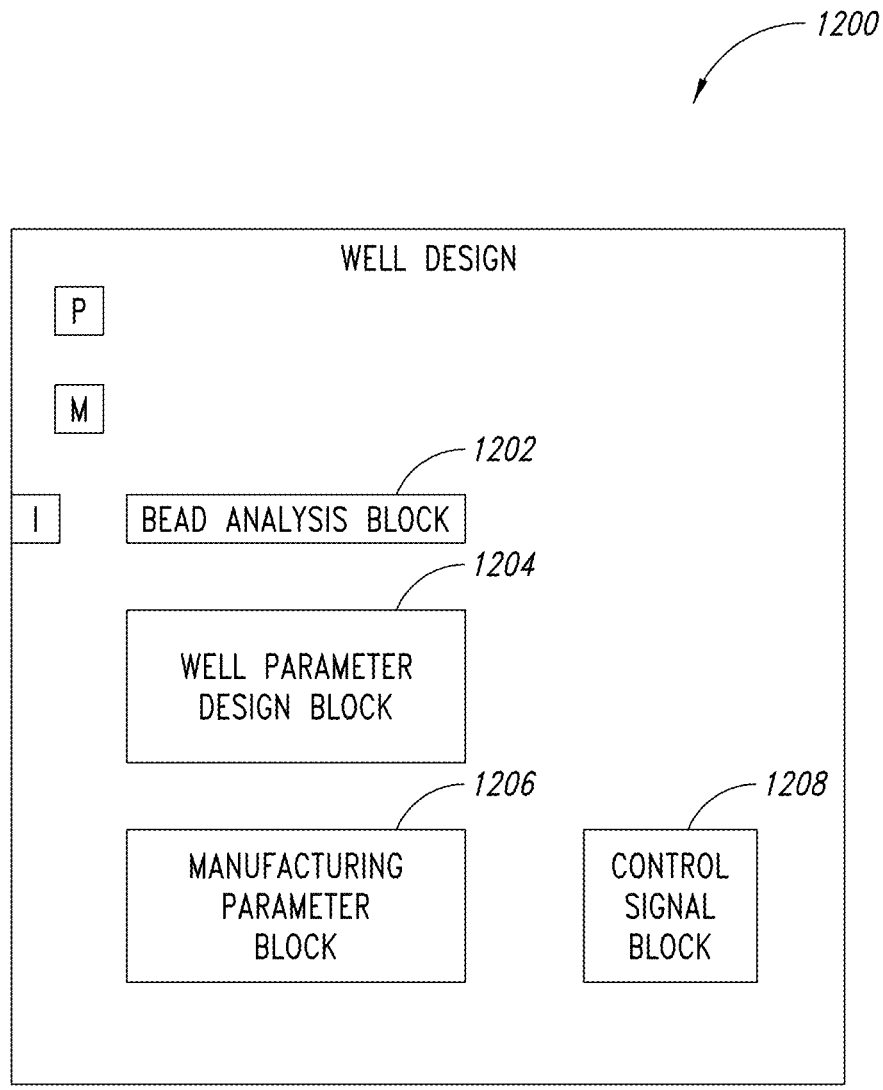
FIG. 12 illustrates a system for designing a microarray.

FIG. 12 is a functional block diagram of a system 1200 implementing an embodiment of a system for designing wells of a microarray. The system 1200 comprises a bead analysis block 1202 configured to analyze data pertaining to beads to be used with the microarray. For example, the bead analysis block 1202 may be configured to determine a diameter and a roughness of beads based on data pertaining to roughness features of the bead.

The system 1200 comprises a well design parameter block 1204 configured to generate well design parameters based on the analysis of the bead analysis block 1202. For example, the well design parameter block 1204 may be configured to generate parameters specifying a depth, upper and lower diameters and a roughness of a well. The well design block 1204 may be configured to base the well design parameters on other data as well, such as characteristics of a process to be used to generate the wells in a substrate or characteristics of the substrate, such as a thickness of the substrate.

The system 1200 comprises a manufacturing parameter block 1206 configured to generate well manufacturing parameters based on the well design parameters. For example, the manufacturing parameter block 1206 may be configured to generate parameters regarding a shape of a mask to be applied to a substrate and a duration of an etching process.

The system 1200 comprises a control signal block 1208 configured to generate control signals to control a manufacturing process based on the well manufacturing parameters.

The system 1200 comprises an interface I configured to receive and transmit data and control signals. The interface I may be coupled to, for example, a measurement device, a user input device (not shown), manufacturing devices, etc.

The system 1200 may be implemented in a variety of ways, including as separate subsystems. The system 1200 may be implemented as a digital signal processor (DSP), an application-specific integrated circuit (ASIC), or the like, or as a series of instructions stored in a memory, such as the memory M and executed by a controller, such as the processor P. Thus, software modifications to existing hardware may allow the implementation of the system 1200. Various subsystems, such as the bead analysis block 1202 and the well parameter design block 1204 are identified as separate blocks in the functional block diagram of FIG. 12 because they perform specific functions. These subsystems may not be discrete units but may be functions of a software routine, which will probably, but not necessarily, be separately callable and hence identifiable elements. Any suitable software or combinations of software may be used to implement the system 1200.

While the illustrated embodiment denotes a single processor P, other embodiments may comprise multiple controllers or processors. The memory M may comprise, for example, registers, read only memory ("ROM"), random access memory ("RAM"), flash memory and/or electronically erasable read programmable read only memory ("EEPROM"), and may provide instructions and data for use by the system 1200.

The concept of controlling the roughness of surfaces to take advantage of Van der Waals interaction forces can be extended to other micro devices and arrays. For example, as mentioned above pillars can be used instead of wells or depressions to attract beads in a microarray. In another example, the roughness of moveable and of non-movable components of micro-devices, such as MEMS or NEMS devices, may be controlled to take advantage of Van der Waals interaction forces.

Figure 13:
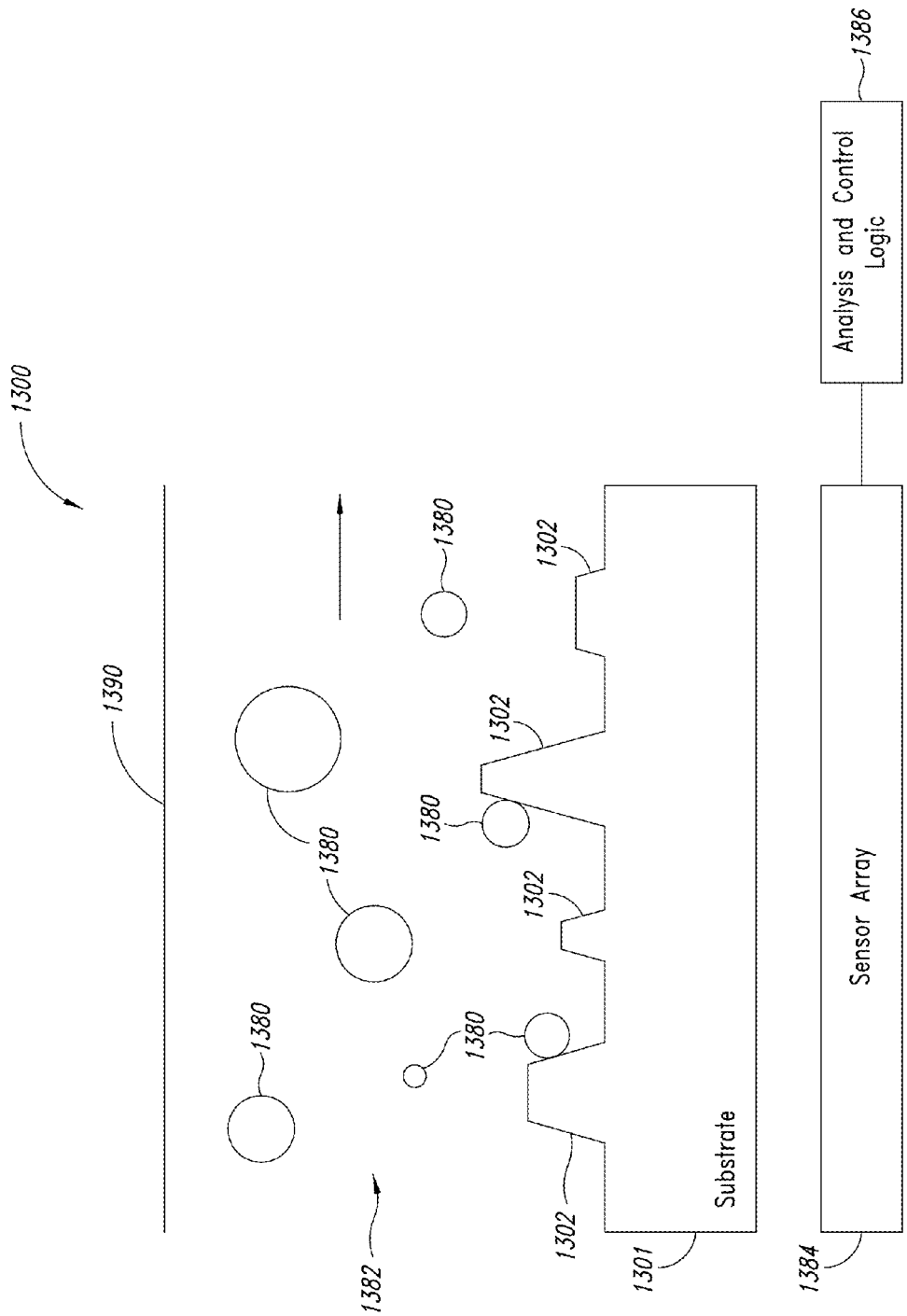
FIG. 13 is a functional block diagram of an embodiment of a microarray system.

FIG. 13 is a functional block diagram of an embodiment of a microarray system 1300. The system 1300 comprises a substrate 1301 having a plurality of pillars 1302. The pillars 1302 may be of relatively uniform distribution and shape and size, or may be randomly or otherwise distributed and have various shapes and sizes. The pillars 1302 may have varying degrees of roughness. The substrate may have wells (see FIG. 10) or fins (see FIG. 15) in addition to or instead of pillars. The substrate 1301 is exposed to a plurality of beads 1380. For example, the plurality of beads 1380 may pass over the substrate 1301 in a channel 1382 formed between the substrate 1301 and a channel wall 1390. Some of the beads 1380 may be attracted to and trapped on the pillars 1302. Some of the pillars may not capture any beads. A sensor array 1384 is configured to detect beads captured on the pillars 1302 and characteristics of the beads and/or of the pillars, and to generate corresponding signals. For example, the sensor array 1384 may detect colors of captured beads 1380 and locations of the pillars 1302 capturing beads. As illustrated, the sensor array 1384 is separate from and below the substrate 1301. In some embodiments, the sensor array 1384 may be integrated into the substrate 1301 or positioned in another position with respect to the substrate 1301. For example, the sensor array 1384 may be positioned above the substrate and together the sensor array 1384 and the substrate 1301 may form the channel 1382.

The sensor array 1384 is coupled to an analysis and control block 1386, which is configured to analyze signals received from the sensor array 1384. The analysis and control block 1386 may contain various components and be configured to execute various programs or modules. For example, the analysis and control block may perform various functions similar to those discussed above with respect to the analysis and control block 1086 of FIG. 10.

Figure 14:
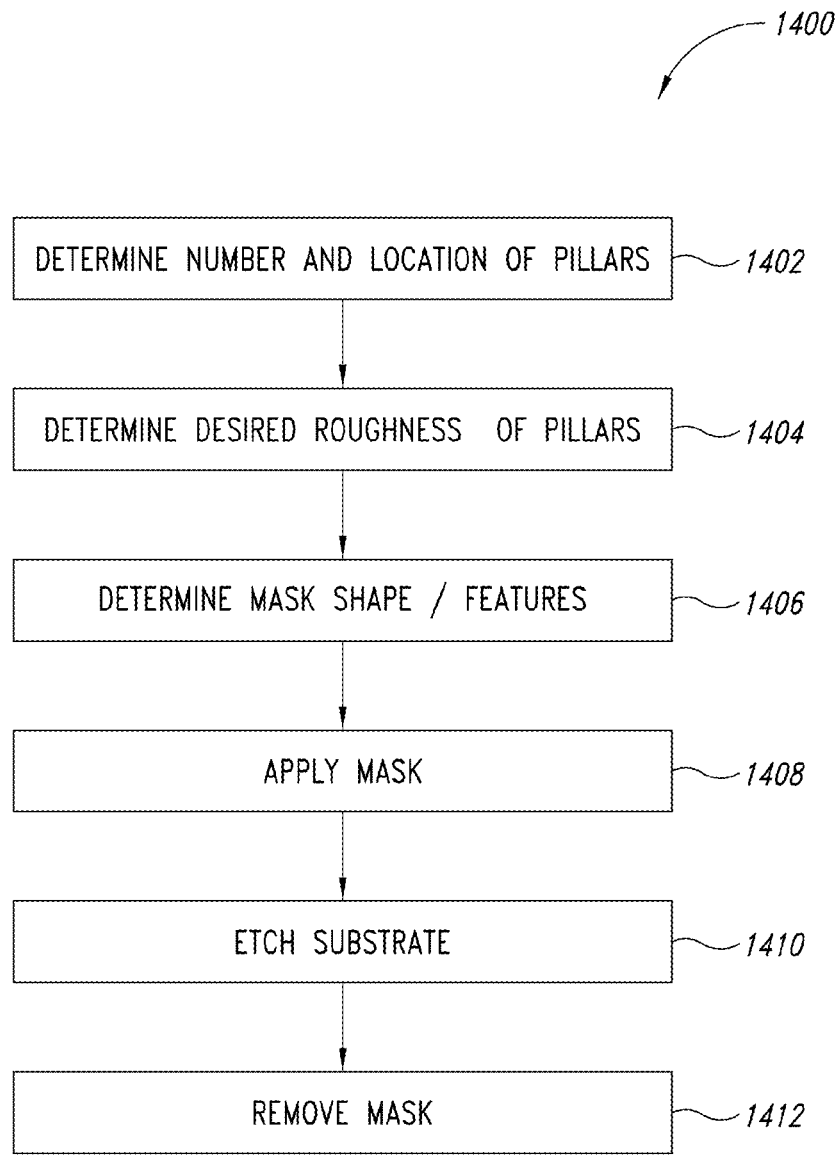
FIG. 14 illustrates an embodiment of a method of forming a bead chip array.

FIG. 14 illustrates an embodiment of a method 1400 of forming a bead chip microarray. At act 1402, a desired number and location of pillars on a substrate is determined. The desired number and location may be determined based on, for example, characteristics of the beads to be used with the microchip array.

At act 1404, a desired roughness of one or more of the pillars is selected. The desired roughness of a pillar may be determined, for example, based on a roughness of beads to which the pillar is configured to bind. The desired roughness may be selected so as to increase, or so as to decrease, a likelihood that beads of a selected roughness will bind to the pillar. For example, a roughness similar to a roughness of a type of bead may be selected when it is desired to increase a likelihood of that type of bead binding to the pillar. Conversely, a different roughness than a roughness of a type of bead may be selected when it is desired to decrease a likelihood of that type of bead binding to the pillar. The desired roughness of the pillar may be uniform or non-uniform. For example, the roughness may be uniform along the sides of the pillar, or a first portion of the side of a pillar may have a first roughness, and a second portion of the side of the pillar may have a different roughness.

At act 1406, a mask shape for the array is determined based on the determined desired roughness and the locations and numbers of the pillars. For example, a desired roughness of a pillar may correspond to having roughness features spaced a distance apart and of a selected thickness, such as 0.04 microns. Thus a polygonal mask shape having corners spaced apart a distance D may be selected. When forming wells (see FIG. 11), the polygonal shape may be a hole in the mask. When forming pillars, the polygonal shape may be a solid polygon in the mask. Other shapes may be employed. See, for example, FIGS. 6-8. Masks with holes or solid shapes with corners and combinations thereof may be employed to form other features on a substrate, such as fins, fingers, depressions, ellipsoids, etc. The height, the diameter, the shape and the desired roughness are all factors that may be considered in determining the mask shape. In general, the roughness of a pillar will be a function of the height of the pillar, the upper and lower diameters of the pillar, the mask shape, and the etching process.

At act 1408, the selected mask is applied to the substrate. For example, a photo-resistive mask may be applied to the substrate. At act 1410, the substrate is etched, leaving the pillars. Varying parameters in the etching process may impact the height and diameters of the pillars. For example, varying the length of time of the etching process may vary the height of the pillar. Thus, varying etching parameters may impact the roughness of the pillar and thus the etching parameters to be used may be factored into the design of the mask. At act 1412, the mask is removed.

Embodiments of methods of producing a bead chip microarray may include additional acts other than those shown in FIG. 14 and may not contain all the acts shown in FIG. 14. Some embodiments may combine acts or perform acts in different orders. For example, some embodiments may determine the desired roughness of the pillars before determining the number and location of the pillars, or may combine the acts of determining the desired roughness and determining the number and location of the pillars. In another example, mask and etching steps may be applied iteratively.

A variety of techniques may be used to form pillars on a substrate, including, for example, photolithography, stamping, molding and etching, and combinations thereof. These techniques can be modified so that the desired roughness of the pillars is considered in the design and manufacturing process of the substrate. For example, as described above with respect to FIG. 13, the shape of the mask may be designed so as to generate striations at desired locations. Similarly, the shape of the punch in a stamping technique or the shape of a mold in a molding technique may be modified to control the roughness of a pillar produced by the punch or the mold.

The concept of controlling the surface roughness may be extended to other features or structures of substrates, such as fins, fingers, depressions, ellipsoids, etc., and to structures of substrates with combinations of features, such as pillars with wells or depressions.

The concepts of using Van der Waals interaction forces can also be extended to other micro devices. For example, biological or particle filters or detectors, or to surface preparation applications. For example, the roughness of features of a substrate or of a surface can be selected so as to match, or to not match, the roughness of, for example, a particle, a cell, a bead, an antigen, an antibody, a polynucleotide, a molecule, another surface of the substrate, etc., and the manufacturing process controlled so as to produce the desired roughness of the feature or surface. The methods of FIGS. 11 and 14 and the system of FIG. 12 can be modified to design the roughness of features of substrates other than wells and of surfaces, and to features of other micro-devices.

Figure 15:
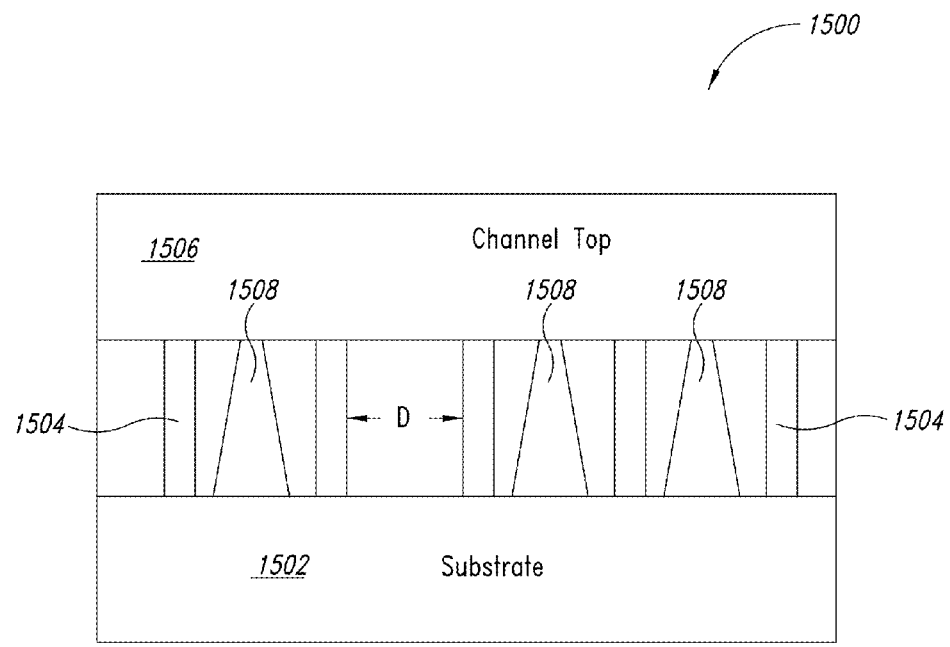
FIG. 15 illustrates an embodiment of a micro device.

FIG. 15 illustrates a front view of an embodiment of a micro device 1500 employing Van der Waals interaction forces to filter a fluid or to trap constituent products of a fluid, such as blood. The device 1500 has a substrate 1502 with a plurality of structures 1504 extending from the substrate 1502 to a channel top 1506, which may, for example, be another substrate or part of the same substrate 1502. As illustrated, the structures are pillars, but structures having other shapes may be employed in various combinations. As illustrated, the pillars 1504 are spaced apart a distance D. This distance D may be selected, for example, to prevent white blood cells from passing through the filter, or to prevent particles of a particular size from passing through the filter. The roughness of the pillars could be controlled so as to prevent white blood cells (or particles, etc.) from sticking to the pillars. For example, if an embodiment of the device 1500 is a white blood cell filter, it would be desirable to prevent white blood cells both from passing through the filter and from clogging the filter by sticking to the pillars. Internal cone-shaped structures 1508, which may be behind the pillars 1504, or recessed from the pillars 1504, may have a different surface roughness. For example, the roughness of the structures 1508 may be controlled so as to attract an antibody in blood. In another example, the roughness of the structures 1508 may be based on a roughness of a linker layer (such as an antigen or an antibody layer, etc.) covering the structures 1508, so that the linker layer adheres better to the structure. The linker layer then attracts and binds to the desired particle, cell, etc.

Figure 16:
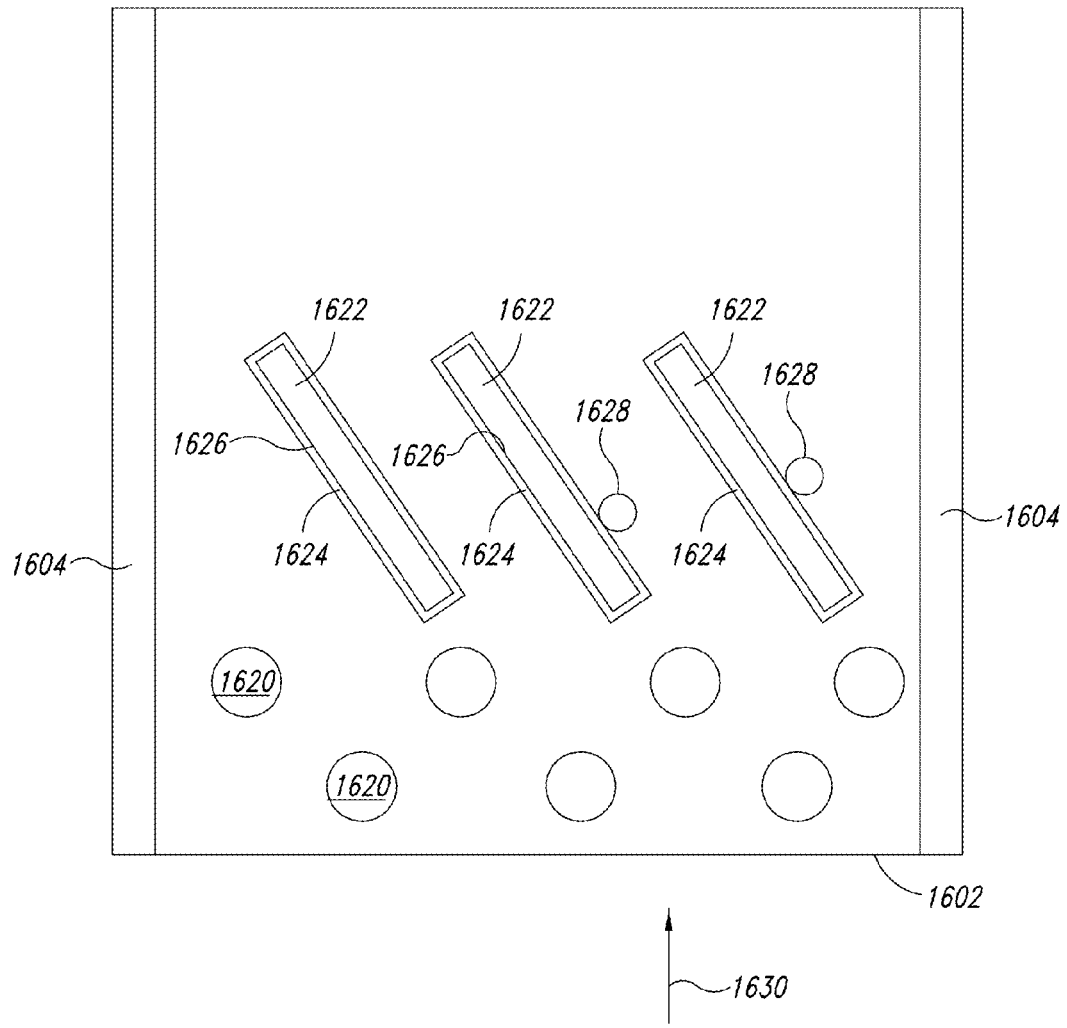
FIG. 16 illustrates an embodiment of a micro device.

FIG. 16 is a top view of an embodiment of a micro device 1600 similar to the device 1500 of FIG. 5, but with the channel top not shown for illustration purposes. The device 1600 has a substrate 1602 and sides 1604. As illustrated, the device is a filter/trap designed to filter a fluid and to capture particular particles in the filtered fluid flowing through the device in the direction shown by arrow 1630. The device 1600 has a plurality of pillars 1620 spaced apart so as to filter out large particles in the fluid, such as white blood cells in blood, etc. The device 1600 has a plurality of fins 1622 coated with a linking layer 1624. A surface 1626 of the fins 1622 has a roughness configured to match a roughness of the linking layer 1624, so that the linking layer 1624 adheres better to the fin 1622. For example, the linking layer may comprise a particular antigen designed to bind to a particular antibody. As blood passes through device 1600, if the antibody is present it will bind to the antigen and the presence of the antibody in the blood can be detected. As illustrated, antibodies 1628 are binding to linking layer 1624.

Figure 17:
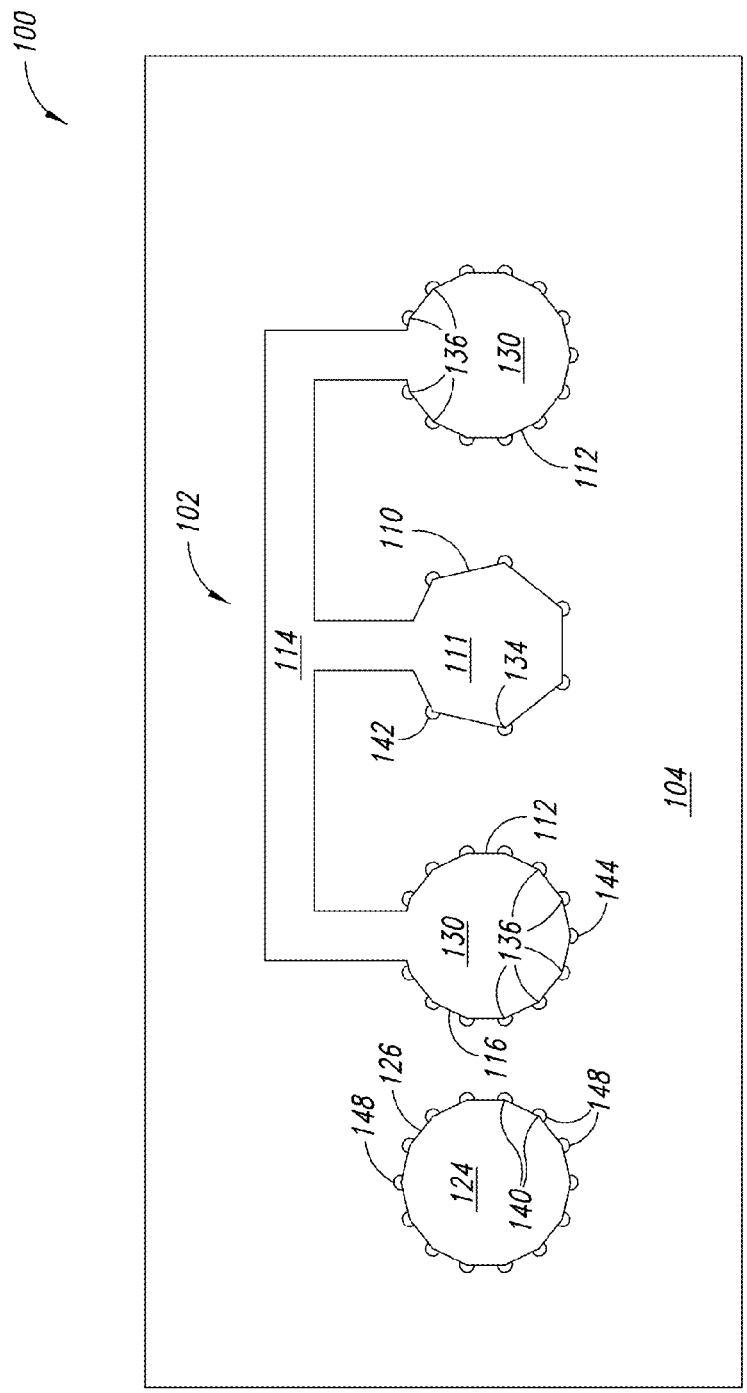
FIG. 17 is a partial top view of an embodiment of a MEMS device.
Figure 18:
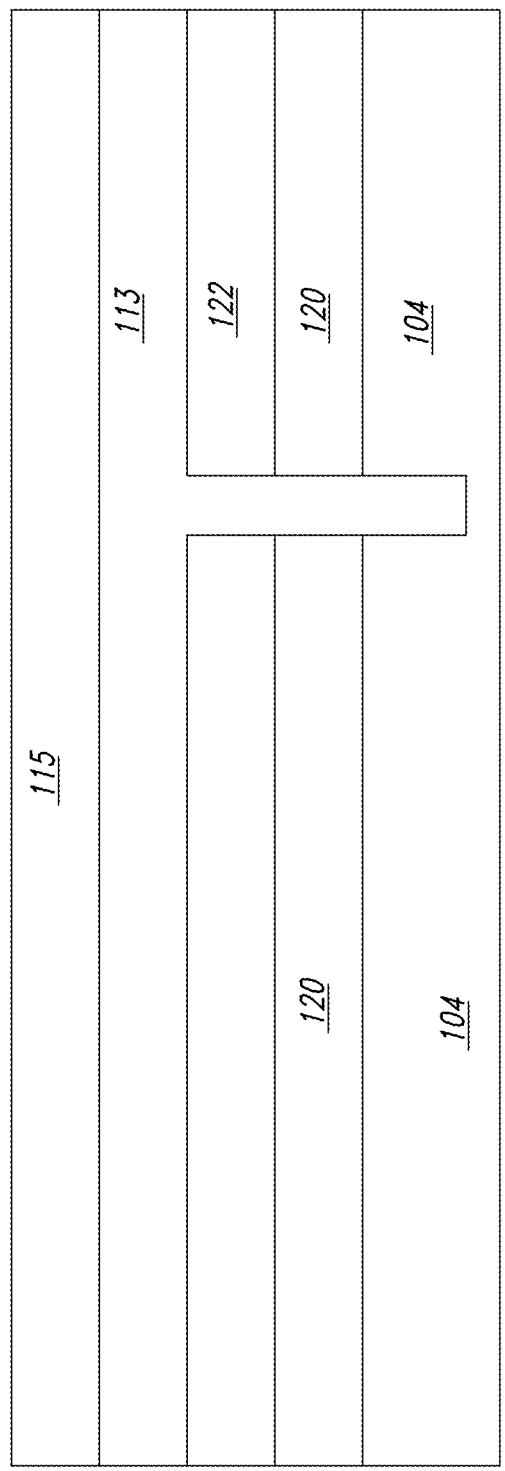
FIGS. 18-20 are side cross-sectional views of an embodiment of a MEMS device during various stages of an embodiment of a manufacturing process.
Figure 19:
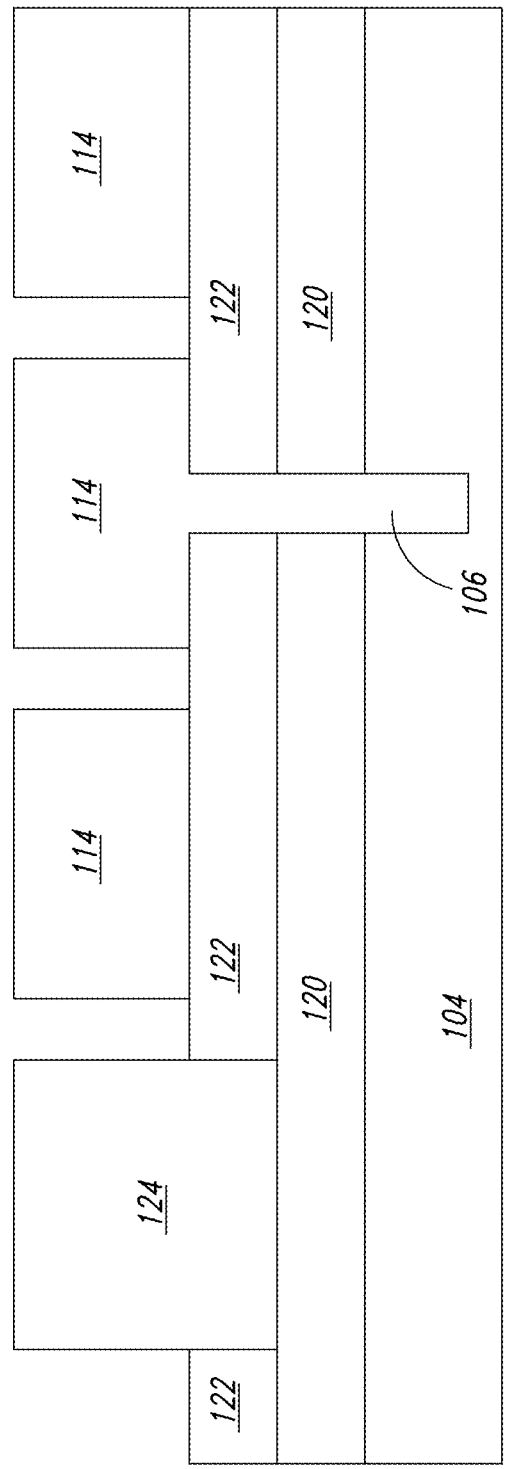
Figure 20:
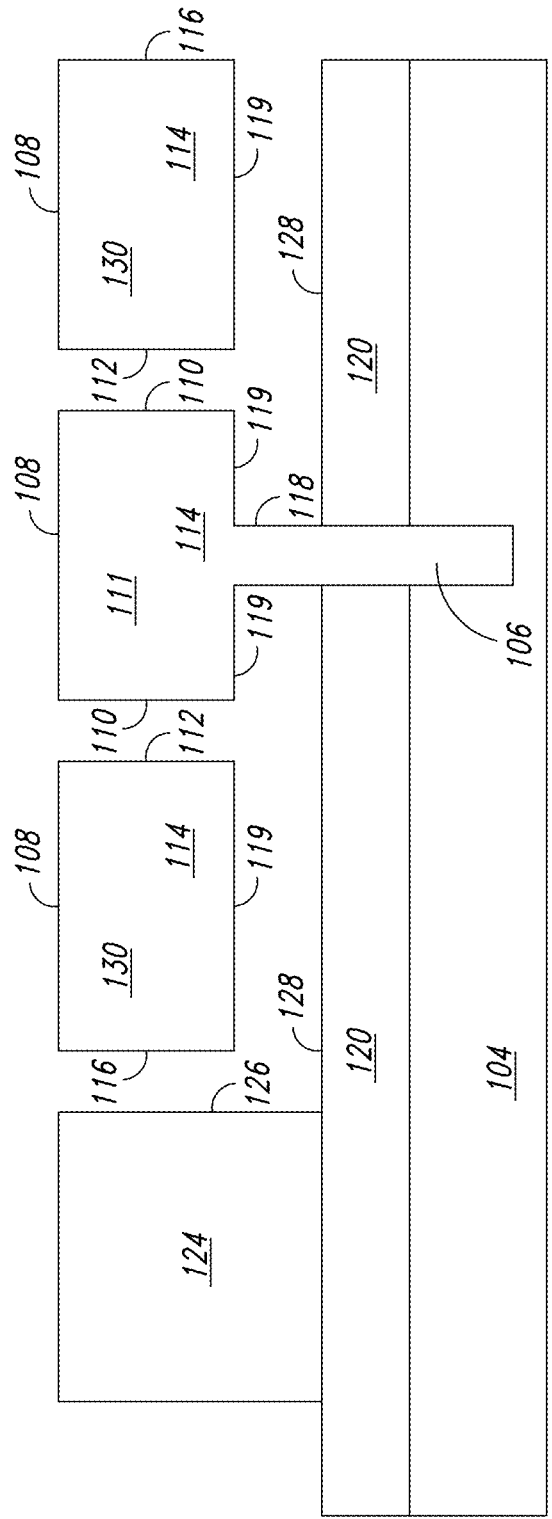

FIG. 17 illustrates an embodiment of a MEMS device 100. FIG. 17 is a partial top view of the MEMS device 100. FIGS. 18-20 are partial side cross-sectional views of a MEMS device 100 (such as the MEMS device 100 of FIG. 17) during various stages of an embodiment of a fabrication process.

The MEMS device 100 has a moveable component 102 moveably secured to a substrate 104 by a coupling element 106, such as an anchor, axis, etc., moveably securing a body 114 of the moveable component 102 to the substrate 104. The moveable component 102 may move with respect to the substrate 104 while remaining secured to the substrate 104. The coupling element 106 may be integral with or secured to the moveable component 102. The moveable component 102 may have various thicknesses, shapes, masses, and may comprise various materials and combinations of materials. These and other features of the moveable component may depend, for example, on the desired features of the MEMS device. For example, the moveable component 102 may comprise various types of materials, such as a silicon-based material, such as poly-silicon, silicon-germanium (SiGe), etc. The thickness, shape, mass, etc., may be determined based, for example, on a desired amount of force to cause the moveable component 102 to deflect, etc. The moveable component 102 may be, for example, an electrode of a set of capacitively coupled electrodes which may be utilized in a variety of applications, such as accelerometers, temperature and pressure sensors, and gyroscopes. For example, the moveable component 102 may be configured to deflect in response to an acceleration force. A second electrode and appropriate circuitry (not shown) may be configured to detect a change in the capacitance between the two electrodes and signal a detected acceleration force. The moveable component 102 may be a gear or wheel (for example, turning on an axis, such as the anchor 106, or other axis), a cantilever, etc. The moveable component 102 may comprise sub-components that are moveable with respect to each other.

The substrate 104 may be formed, for example, of monocrystalline semiconductor material such as silicon. As shown in FIG. 18, an optional sub-structure 120 is positioned, for example, formed, deposited, grown, etc., on the substrate 104. The sub-structure 120 may comprise, for example, electrodes, passive components, active components, mechanical components, etc., and may comprise multiple layers, sub-layers and regions. A sacrificial layer 122 is positioned, for example, formed, deposited, grown, etc., on the sub-structure 120. While the illustrated embodiment is described in terms of layers, regions (such as sacrificial or substructure regions) may be employed. The sacrificial layer 122 may, for example, be a thermal oxide, such as silicon dioxide (SiO2), tetra ethyl ortho silicate (TEOS), borophosphosilicate glass (BPSG), spin-on glass, poly germanium, combinations thereof, etc., or any suitable sacrificial layer that is wholly or partially removable later in the process. For example, a plasma etch chemical vapor deposition (PECVD) technique may be used to deposit the sacrificial layer 122. The sacrificial layer 122 may have various thicknesses, for example, of one to two microns. The body 114 of the moveable component 102, for example an electrode, a mass, a beam structure, etc., is positioned, for example, formed, deposited, grown, etc., on the sacrificial layer 122. For example, a layer of a desired body material 113 may be positioned on the sacrificial layer using plating.

A mask 115 may be positioned, for example, formed deposited, grown, etc., on the layer of desired body material 113. For example, a photo-resist mask may be applied. Etching may then be performed to remove excess body material 113 and form the body 114 of the moveable component 102 and of an adjacent component (see adjacent component 124 of FIG. 17). FIG. 19 illustrates the embodiment of FIG. 18 after an etching process has been performed to form the body 114 of the moveable component 102 and the mask 115 has been removed. FIG. 19 also illustrates the component 124 of the MEMS device 100 adjacent to the moveable component 102. The adjacent component 124 has a surface 126 facing the moveable component 102 of the MEMS device 100. FIG. 20 illustrates the MEMS device 100 after the sacrificial layer 122 has been removed, releasing or partially releasing the moveable component 102. For example, the MEMS device 100 may be exposed to processes that remove the sacrificial layer 122. For example, $HF_2$, $H_2O_2$, etc., etching, or other agents or treatments may be employed to remove the sacrificial layer 122.

Moveable components, such as, for example, silicon-based components, may sometimes stick to themselves, to other components, including other moveable components, for example, during or after the fabrication process. In an embodiment, the fabrication process may be controlled to control a roughness of one or more surfaces of the MEMS device. For example, the roughness of surfaces of components of the MEMS device, such as one or more surfaces of the moveable component 102, one or more surfaces of other components, surfaces of the substructure, etc., may be controlled to make the surfaces more or less likely to stick together. As illustrated in FIGS. 17-20, the moveable component 102 has various surfaces, including a surface 119 facing the substructure 120, a surface 108 opposite of the surface 119, side surfaces 110 of a center portion 111 of the moveable component 102, inside surfaces 112 of a surrounding portion 130 of the moveable component 102, surrounding the center portion 111 of the moveable component 102, and outside surfaces 116 of the surrounding portion 130 of the moveable component 102. As illustrated, the coupling element 106 has a surface 118 and the substructure 120 has a surface 128 facing the surface 119 of the moveable component 102. The roughness of the various surfaces of the MEMS device 100 may be selected so as to increase or decrease a likelihood that surfaces will stick together.

Figure 21:
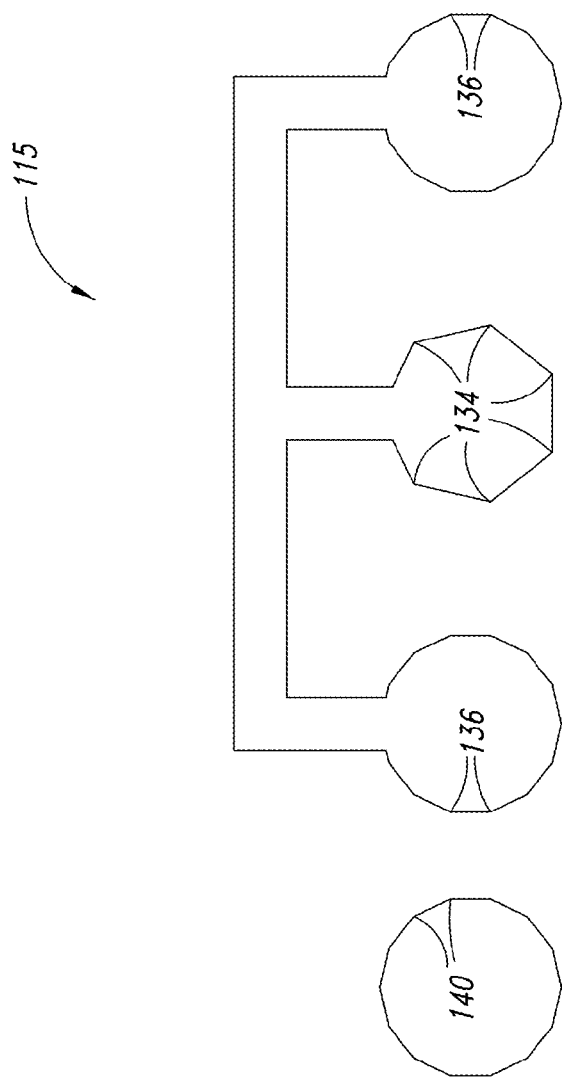
FIG. 21 is a top view of an embodiment of a mask that may be employed during a manufacturing process of an embodiment of a MEMS device.

FIG. 21 is a top view of an embodiment of a mask 115 that may be employed, for example, in a fabrication process of the embodiment of a MEMS device 100 of FIG. 17, to control a manufacturing process so as to create surfaces with desired roughnesses. The mask may be applied during a single masking and etching process, or in different masking and etching processes, and may be employed with other masks in various combinations. FIG. 17 is a top view of an embodiment of a MEMS device in which the mask 115 of FIG. 21 was employed. The mask 115 has a first plurality of corners 134 corresponding to the side surfaces 110 of the inner portion 111 of the moveable component 102, and a second plurality of corners 136 corresponding to inside surfaces 112 of the surrounding portion 130 of the moveable component 102. For ease of illustration, FIG. 21 shows masks with only a limited number of corners. However, embodiments may employ mask shapes with large numbers of corners approximating a wide variety of shapes, such as, for example, curves, ovals, etc. The mask 115 also has a plurality of corners 140 corresponding to the inner surface 126 of the adjacent component 124. After etching, the moveable component 102 has a plurality of striations 142 on the surface 110 proximate the corners 134 of the mask 115, and a plurality of striations 144 on the surface 112 proximate the corners 136 of the mask 115. The adjacent component 124 has a plurality of striations 148 on the surface 126 proximate the corners 140 of the mask 115.

As illustrated, the striations 142 of the surface 110 have a spacing and size different from the striations 144 on the surface 112 of the moveable component, and thus the surfaces 110, 112 have a dissimilar roughness, making the surfaces 110, 112 less likely to stick together should the surfaces come into contact with each other. Making the surfaces less likely to stick together may be desirable, for example, to prevent the moveable component from sticking in a deformed state should the application of a force cause the surfaces to come into contact with each other. In some embodiments, the striations 142, 144 may be made more or less similar, thus making the surfaces 110, 112 more or less likely to stick together.

As illustrated, the striations 144 of surface 116 of the moveable component 102 and the striations 148 of the surface 126 of the adjacent component 124 have a similar size and spacing, making the surfaces more likely to stick together should the surfaces 116 and 126 come into contact with each other. Making the surfaces 116 and 126 more likely to stick together may be desirable, for example, if one of the purposes of the MEMS device 100 is detect whether a system including the MEMS device has been subject to a force great enough to cause the moveable component 102 to come into contact with the adjacent component 124. In some embodiments, the striations 144, 148 may be made more or less similar, thus making the surfaces 116, 126 more or less likely to stick together. Making the surfaces 116 and 126 less likely to stick together may be desirable, for example, if it is desired that the MEMS device 100 be able to recover from application of a force sufficient to cause the surface 116 to come into contact with the surface 126. While the moveable component 102 and the adjacent component have been illustrated as having shapes approximating rectilinear shapes, other shapes may be employed, such as cylindrical shapes and shapes having convex and concave surfaces, etc., and combinations thereof.

Embodiments of micro-fabricated structures, as well as embodiments of processes of manufacturing micro-fabricated structures may include additional features not shown in FIGS. 17-21, and may not include all of the features shown in FIGS. 17-21. For example, a moveable component may have more than one coupling or anchor moveably securing the moveable component to a substrate, a MEMS device or other micro-fabricated structure may have more than one moveable component, more than one optional sub-structure, additional layers and moveable components above, below or beside the illustrated layers and moveable components, and additional sacrificial layers and/or treatment layers may be employed in the process, etc.

Figure 22:
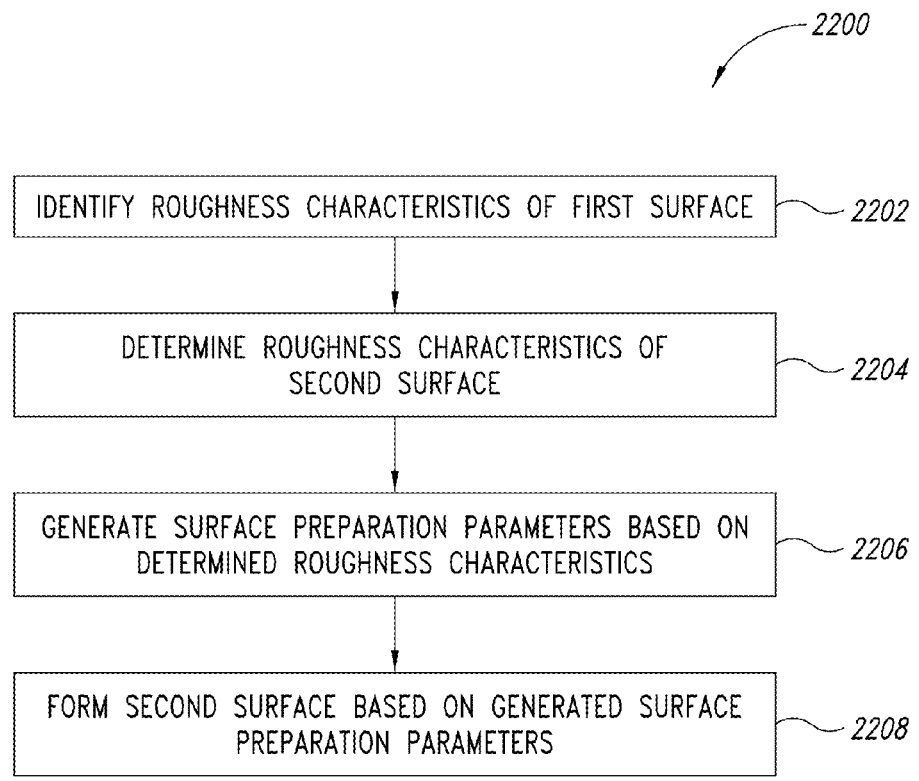
FIG. 22 illustrates an embodiment of a method of forming a micro device.

FIG. 22 illustrates an embodiment of a method 2200 of forming a micro device. At act 2202, roughness characteristics of a first surface, such as a surface of an object, are analyzed or identified. At act 2204, roughness characteristics of a second surface are determined based on the identified roughness characteristics of the first surface. At act 2206, surface preparation parameters are generated based on the determined roughness characteristics. At act 2208, the second surface is formed based on the generated surface preparation parameters. Embodiments of the method 2200 may employ various of the techniques discussed herein. For example, masks may be employed to form the second surface and the surface preparation parameters may define the shape of the mask, etc. Embodiments of methods of forming a micro device may include additional acts other than those shown in FIG. 22 and may not contain all the acts shown in FIG. 22. For example, some embodiments may include determining a depth of the well or a height of a structure. Some embodiments may combine acts or perform acts in different orders.

Some embodiments may take the form of or comprise computer program products. For example, according to one embodiment there is provided a computer readable medium comprising a computer program adapted to perform one or more of the methods or functions described above. The medium may be a non-transitory medium such as a physical storage medium, for example, a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., programmed by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    analyzing roughness characteristics of a first surface;
    determining desired roughness characteristics of a second surface based on the analysis of the roughness characteristics of the first surface;
    generating surface preparation parameters based on the determined desired roughness characteristics of the second surface; and
    forming the second surface based on the generated surface preparation parameters, the second surface being a surface of a substrate and at least the determining and the generating being performed using one or more configured processing devices.

2. The method of claim 1 wherein the generating surface preparation parameters comprises determining a shape of an opening in a mask and the forming the second surface comprises applying the mask to the substrate and etching the substrate.

3. The method of claim 2 wherein the opening has a substantially polygonal shape.

4. The method of claim 1 wherein the first surface is a surface of a type of object.

5. The method of claim 4 wherein the determining desired roughness characteristics of the second surface comprises determining roughness characteristics to bind to the type of object based on an analysis of roughness characteristics of the type of object.

6. The method of claim 4 wherein the type of object is a type of linking layer.

7. The method of claim 1 wherein,
    the analyzing roughness characteristics of the first surface comprises identifying roughness characteristics of a first type of microbead;
    the determining desired roughness characteristics of the second surface comprises determining desired roughness characteristics of a well to bind to the first type of microbead based on the identified roughness characteristics of the first type of microbead;

the generating surface preparation parameters based on the determined desired roughness characteristics comprises generating well parameters based on the determined desired roughness characteristics of the well; and the forming the second surface comprises forming the well in a substrate based on the generated well parameters.

8. The method of claim 7 wherein the generating well parameters comprises determining a shape of an opening in a mask and the forming the well in the substrate comprises applying the mask to the substrate and etching the well in the opening in the substrate.

9. The method of claim 8 wherein the opening has a substantially polygonal shape.

10. The method of claim 7 wherein the forming the well comprises forming a plurality of striations in the inside surface of the well and a number and positioning of the plurality of striations are based on the identified roughness characteristics of the first type of microbead.

11. The method of claim 10 wherein the plurality of striations have a thickness based on the identified roughness characteristics of the first type of microbead.

12. The method of claim 11 wherein the well has an upper perimeter having a plurality of corners.

13. The method of claim 12 wherein each striation extends longitudinally from at least proximate a respective corner of the plurality of corners toward a lower perimeter of the well.

14. The method of claim 7 wherein the well is one of a first plurality of wells positioned in the substrate and configured to bind to the first type of microbead, and each well in the first plurality of wells has a roughness based on the roughness characteristics of the first type of microbead.

15. The method of claim 7, further comprising forming a second plurality of wells positioned in the substrate and configured to bind to a second type of microbead, wherein each well in the second plurality of wells has a roughness based on roughness characteristics of the second type of microbead.

16. The method of claim 1 wherein the substrate comprises a terminal end of a bundle of fiber optic cables.

17. The method of claim 1 wherein the first surface is another surface of the substrate and the determining the desired roughness characteristics of the second surface comprises determining roughness characteristics dissimilar to the roughness characteristics of the first surface.

18. The method of claim 1 wherein the first surface is another surface of the substrate and the determining the desired roughness characteristics of the second surface comprises determining roughness characteristics similar to the roughness characteristics of the first surface.

* * * * *